(12) United States Patent
Kangaspunta

(10) Patent No.: US 10,810,445 B1
(45) Date of Patent: Oct. 20, 2020

(54) PIPELINE WITH POINT CLOUD FILTERING

(71) Applicant: Zoox, Inc., Foster City, CA (US)

(72) Inventor: Juhana Kangaspunta, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 96 days.

(21) Appl. No.: 16/023,985

(22) Filed: Jun. 29, 2018

(51) Int. Cl.
| | | |
|---|---|---|
| *G06T 7/11* | (2017.01) | |
| *G06K 9/00* | (2006.01) | |
| *G06K 9/62* | (2006.01) | |
| *G06T 3/40* | (2006.01) | |
| *G05D 1/02* | (2020.01) | |
| *G06T 7/143* | (2017.01) | |

(52) U.S. Cl.
CPC ....... *G06K 9/00791* (2013.01); *G05D 1/0246* (2013.01); *G06K 9/6262* (2013.01); *G06K 9/6267* (2013.01); *G06K 9/6292* (2013.01); *G06T 3/4046* (2013.01); *G06T 7/11* (2017.01); *G06T 7/143* (2017.01); *G05D 2201/0213* (2013.01); *G06T 2207/10028* (2013.01); *G06T 2207/20076* (2013.01); *G06T 2207/20081* (2013.01); *G06T 2207/20084* (2013.01); *G06T 2207/30252* (2013.01)

(58) Field of Classification Search
CPC ............................ G06K 9/00791; G06T 7/143
See application file for complete search history.

(56) References Cited

U.S. PATENT DOCUMENTS

| | | |
|---|---|---|
| 8,989,944 B1 | 3/2015 | Agarwal et al. |
| 2017/0371348 A1* | 12/2017 | Mou ..................... G01S 17/931 |
| 2018/0074200 A1 | 3/2018 | Liu et al. |
| 2018/0089505 A1* | 3/2018 | El-Khamy ........ H01L 27/14683 |
| 2019/0066344 A1 | 2/2019 | Luo et al. |
| 2019/0162856 A1 | 5/2019 | Atalla |
| 2019/0196481 A1 | 6/2019 | Tay et al. |

OTHER PUBLICATIONS

Non Final Office Action dated May 21, 2020 for U.S. Appl. No. 16/023,878 "Point Cloud Filtering With Semantic Segmantation" Kangaspunta, 37 pages.

* cited by examiner

*Primary Examiner* — Tuan H Nguyen
(74) *Attorney, Agent, or Firm* — Lee & Hayes, P.C.

(57) ABSTRACT

Techniques are disclosed for filtering point cloud data associated with particulate matter (e.g., gas, exhaust, fog, etc.) which do not impact driving from data used to plan a trajectory and/or a route of a robotic platform. The filtering may be based on determining that a set of points associated with a point cloud represents a navigable space for the robotic platform. The point cloud data may be filtered based on a determination that one or more safety conditions are satisfied. Semantic segmentation may be performed on an image to determine pixel classification probability distributions associated with pixels of the image. Data associated with the set of points may be projected onto the image to identify corresponding pixels. Confidence scores associated with pixel classification probability distributions for the identified pixels may be queried. A classification probability distribution for the set of points may be determined based at least in part on the queried confidence scores.

20 Claims, 10 Drawing Sheets

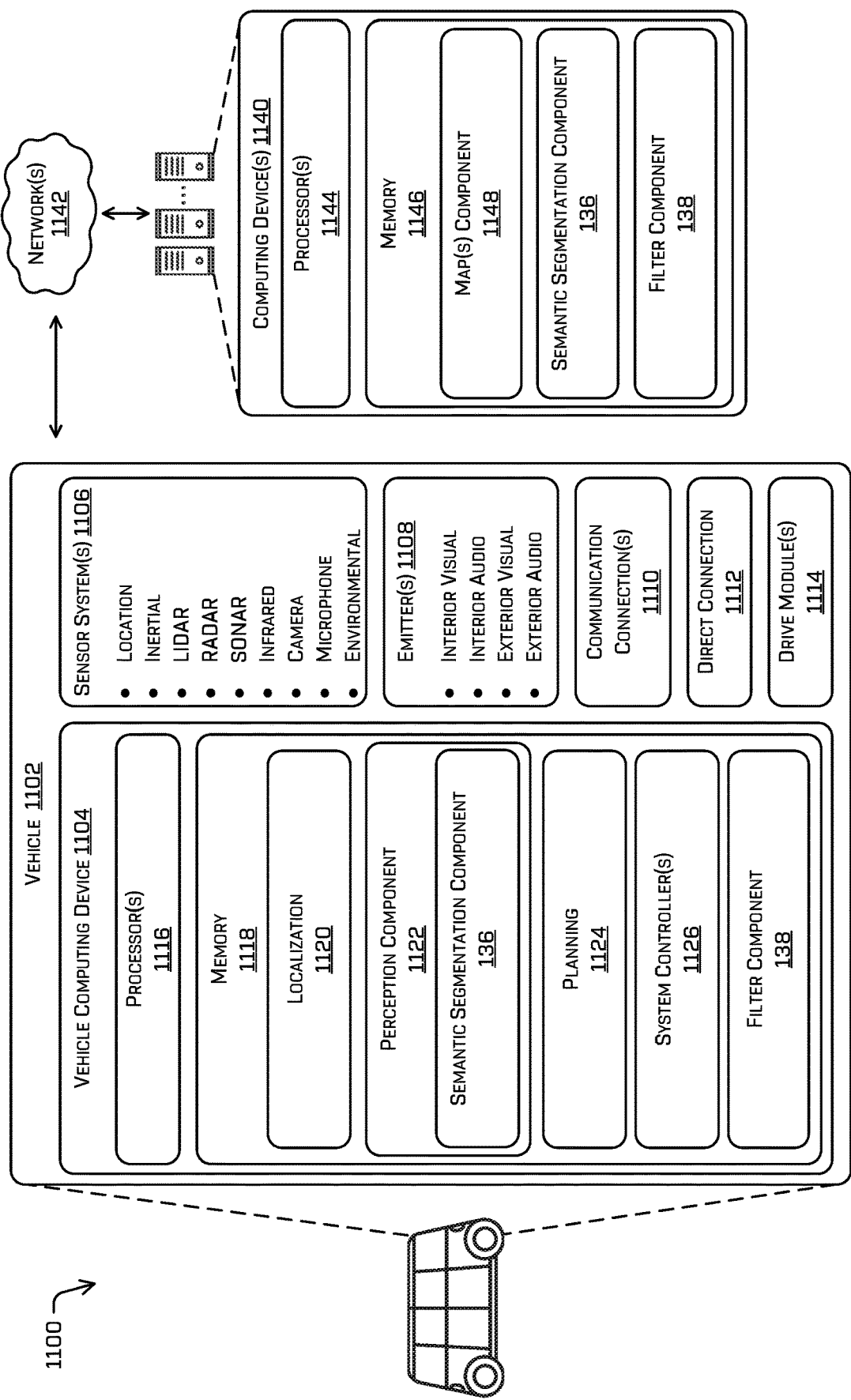

US 10,810,445 B1

PIPELINE WITH POINT CLOUD FILTERING

BACKGROUND

Various methods, apparatuses, and systems are utilized by robotic platforms, such as autonomous vehicles, to guide such systems through environments including any number of obstacles. For instance, autonomous vehicles utilize route planning methods, apparatuses, and systems to guide autonomous vehicles through areas that may include other vehicles, buildings, pedestrians, or other objects. In some examples, particulate matter, such as fog, steam, dust, vehicle exhaust, etc., or other types of matter, may be perceived (e.g., based on sensor data) as an obstacle to the autonomous vehicle, when, in reality, the autonomous vehicle may be capable of safely moving through the perceived obstacle. Such sensor data can present challenges in planning a trajectory and/or a route of the autonomous vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 11 is a block diagram of an example system for implementing the techniques described herein.

DETAILED DESCRIPTION

Figure 1:
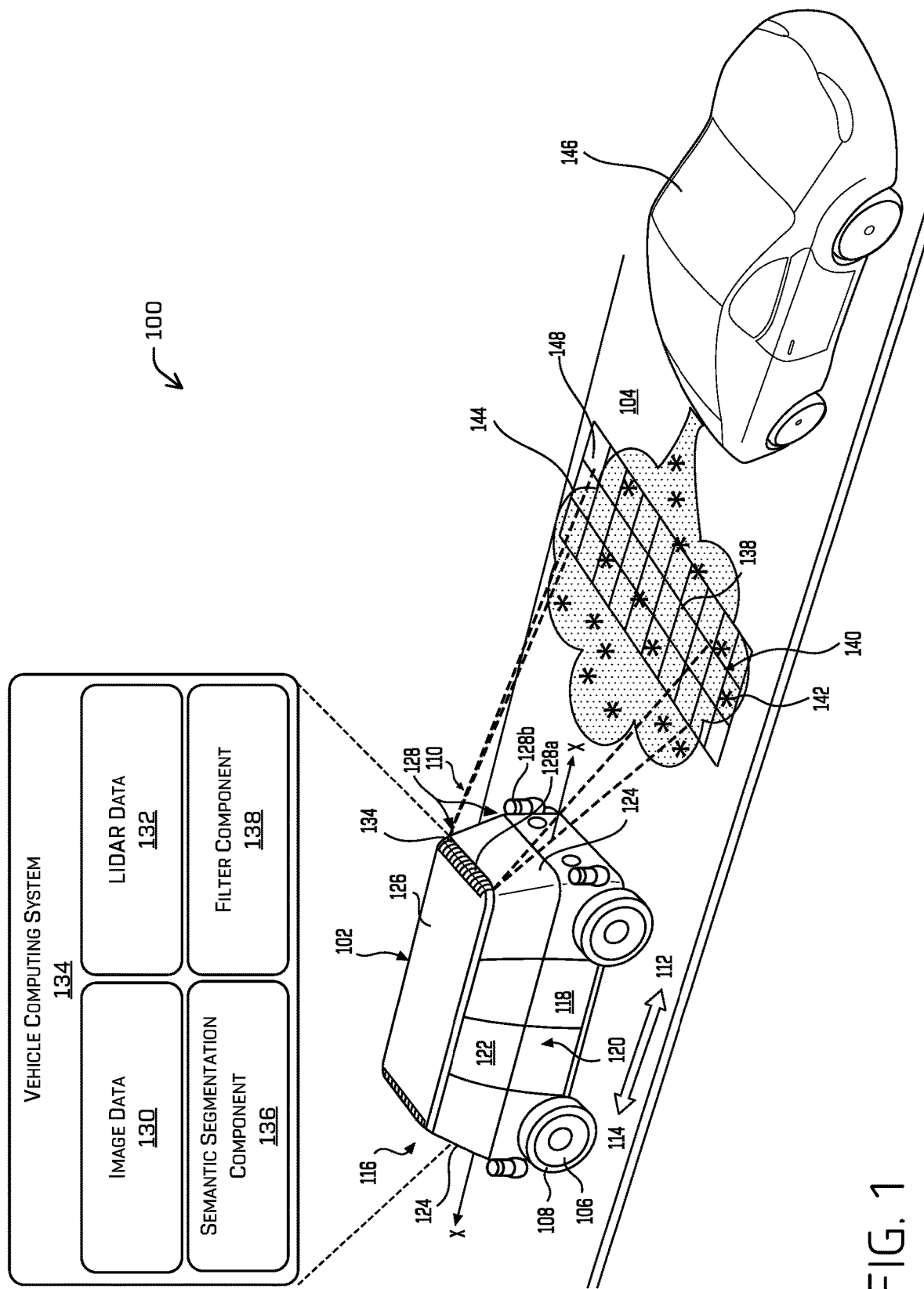
FIG. 1 illustrates an example environment that includes a perspective view of a vehicle having an example filter component for filtering data (e.g., LIDAR returns that may be associated with free space and/or navigable space), in accordance with embodiments of the disclosure.

This disclosure is directed to techniques for filtering out (or discarding) portions of point cloud data (e.g., light detection and ranging (LIDAR) data) which do not impact driving from data used to plan a trajectory and/or a route of a vehicle (e.g., an autonomous vehicle) and/or a robot. In some examples, a LIDAR sensor of a vehicle may capture LIDAR data associated with matter (e.g., particulate matter) in an environment of the vehicle. For example, particulate matter, such as a cloud of fog, steam, dust, vehicle exhaust, or other types of particulate matter may be located in an environment of the vehicle and may not impact driving behavior (i.e., the robotic platform, e.g. an autonomous vehicle, may safely pass through the particulate matter without impact to the platform). The LIDAR data captured by the LIDAR sensor may include data associated with a LIDAR blob (e.g., a cluster of corresponding LIDAR points or voxels) that is representative of the particulate matter which can be ignored, or otherwise discarded, e.g., when planning a trajectory for the platform. As used herein, a blob may include a set of points (e.g., a collection of adjacent LIDAR points associated with returns captured by the LIDAR sensor) which have been identified as belonging to the same object (e.g., an object in the environment or a group of particulate matter, such as a single cloud). A camera of the vehicle may capture image data of the environment. For instance, the image data may include data associated with an image of a portion of the environment that includes at least a portion of the cloud that is represented by the LIDAR blob. The image data and the LIDAR data may be captured substantially simultaneously in some examples. This application describes techniques for determining whether the LIDAR blob is a true obstacle to the autonomous vehicle or is otherwise associated with a blob of particulate matter, for example, exhaust, through which the autonomous vehicle is capable of safely moving.

In various embodiments, a computing system of the vehicle may receive the LIDAR data and the image data and utilize techniques disclosed herein to determine whether the LIDAR blob represents an obstacle to the vehicle. According to some examples, if certain safety conditions are met, the computing system may filter out (e.g., subtract, discard, ignore, etc.) the LIDAR data (associated with the LIDAR blob) from data used to plan a trajectory and/or a route of the vehicle if the computing system determines that the LIDAR data does not represent an obstacle to vehicle.

In some examples, to facilitate discerning whether to incorporate LIDAR returns for planning (e.g., planning a trajectory and/or a route of the vehicle), the computing system may perform semantic segmentation on the image to determine pixel classification probability distributions for pixels of the image. In some embodiments, the computing system may project, onto the image, voxels (and/or data associated with LIDAR points) associated with points of the LIDAR blob to identify pixels in the image that correspond to the voxels. The computing system may query pixel classification probability distributions for the pixels (i.e., query pixels) identified as associated with the voxels associated with the points of the LIDAR blob.

In some embodiments, the computing system may determine that the LIDAR blob (and/or the fog cloud) represents a navigable space for the vehicle. For example, the queried pixel classification probability distributions may be aggregated to determine a classification probability distribution for the LIDAR blob. The LIDAR blob may be assigned to a class of object based on confidence scores associated with the classification probability distribution. In some implementations, the LIDAR blob may be assigned to a class of object associated with a navigable space (e.g., a free space, a driveable surface, etc.). In some examples, the computing system may determine that the LIDAR blob represents a navigable space for the vehicle (e.g., a space that would not impact planning and/or navigation operations of the vehicle) based at least in part on the LIDAR blob being assigned to the class associated with a navigable space.

In various examples, the computing system may filter out the LIDAR data (associated with points of the LIDAR blob) from data used to plan a trajectory and/or a route of the vehicle. For example, the LIDAR data may be filtered out based at least in part on a determination that the LIDAR blob represents a navigable space for the vehicle and/or a determination that one or more safety conditions are satisfied. In some examples, the safety condition(s) may include a first condition that a distance (e.g., a distance between the LIDAR blob and the vehicle) satisfies a threshold distance. Additionally, or alternatively, in some examples the safety condition(s) may include a second condition that a speed of the vehicle satisfies a threshold speed. Additionally, or alternatively, in some examples the safety condition(s) may include a third condition that an amount of the LIDAR blob (e.g., a percentage of the points associated with the LIDAR blob) that is projected onto the image satisfies a threshold amount. Additionally, or alternatively, in some examples the safety condition(s) may include a fourth condition that a confidence level (e.g., a confidence level associated with the LIDAR blob belonging to a class associated with a navigable surface) satisfies a threshold confidence level. The aforementioned examples of safety condition(s) are not intended to be an exhaustive list of examples. Any other suitable type of safety condition may be used in the techniques disclosed herein.

The techniques discussed herein can improve a functioning of a computing device in a number of ways. For example, the techniques discussed herein may include querying pixel classification probability distributions associated with a subset of pixels that is less than a set of all the pixels of the image. Thus, a reduction in an amount of data being queried may be achieved. Furthermore, in some embodiments the techniques discussed herein may include bilinearly upsampling confidence scores associated with pixel classification probability distributions. Thus, a reduction in an amount of data being processed (e.g., bilinearly upsampled) may also be achieved, which may improve, for example, the computer's processing speed and/or processing bandwidth, while reducing an amount of memory required. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a robotic platform, manually driven vehicles, etc.), and is not limited to autonomous vehicles. In another example, the techniques can be utilized in an aviation or nautical context, or in any system using machine vision. Additionally, the techniques described herein can be used with real data (e.g., captured using sensor(s)), simulated data (e.g., generated by a simulator), or any combination of the two. Further, while multiple examples are described herein with respect to discerning whether to include portions of LIDAR data based on corresponding image data, such techniques may be equally applied to various multi-modal systems (e.g., by clustering SONAR, radar, etc., data as blobs and confirming a classification based on semantic segmentation of sensor data from another sensor modality, e.g., a camera).

FIG. 1 illustrates an example environment 100 that includes a perspective view of a vehicle 102 having a LIDAR filter component for filtering LIDAR data (e.g., for discerning LIDAR data which impacts operation of the vehicle 102), in accordance with embodiments of the disclosure. In some embodiments, the environment 100 may include one or multiple features, components, and/or functionality of embodiments described herein with reference to FIGS. 2-11.

In some examples, the vehicle 102 may be configured to travel across a surface 104 (e.g., a road surface, a driveable surface, and/or a navigable surface, etc.), for example, to transport people and/or cargo from a first location to a second location. For the purpose of illustration, the vehicle 102 may be an autonomous vehicle configured to operate according to a Level 5 classification issued in 2013 by the U.S. National Highway Traffic Safety Administration, which describes a vehicle capable of performing all safety-critical functions for the entire trip, with the driver (or occupant) not being expected to control the vehicle at any time. In that case, since the vehicle may be configured to control all functions from start to stop, including all parking functions, it may be unoccupied. This is merely an example, and the systems and methods described herein may be incorporated into any vehicle and/or robot, including those ranging from vehicles that need to be manually controlled by a driver at all times, to those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

In some examples, the vehicle 102 may be an automobile having four wheels 106 and respective tires 108 for each of the wheels 106. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, or any combination thereof. In addition, although the example vehicle 102 may have four wheels, the systems and methods described herein may be incorporated into vehicles having fewer or a greater number of wheels, tires, and/or tracks. The example vehicle 102 may have four-wheel steering and may operate generally with equal performance characteristics in all directions, for example, such that a first end 110 of the vehicle 102 may be in the front end of the vehicle 102 when traveling in a first direction 112, and such that the first end 110 may become the rear end of the vehicle 102 when traveling in the opposite, second direction 114, e.g., as shown in FIG. 1. Similarly, a second end 116 of the vehicle 102 may be the front end of the vehicle 102 when traveling in the second direction 114, and such that the second end 116 may become the rear end of the vehicle 102 when traveling in the opposite, first direction 112. These example characteristics may facilitate greater maneuverability, for example, in small spaces or crowded environments, such as parking lots and urban areas.

The vehicle 102 may include one or more doors 118 on each side 120 of the vehicle 102 for facilitating entry and exit of occupants to and from an interior space 122 of the vehicle 102. The systems and methods described herein may be incorporated into vehicles having fewer or a greater number of doors. The vehicle 102 may include a windshield 124 and a roof 126 extending substantially (e.g., almost entirely) between the first end 110 and the second end 116 of the vehicle 102. In some examples, the vehicle 102 may not include a windshield. Because the example vehicle 102 may be a Level 5 autonomous vehicle, a windshield may not be necessary. However, in some examples, the vehicle 102 may include a windshield 124, regardless of whether the vehicle 110 is configured to be autonomous or manually controlled by a driver. In some examples, at least a portion of the roof 126 may include one more solar cells configured to supply electric energy to the vehicle 102 for powering one or more electrically powered systems of the vehicle 102.

According to various embodiments, the vehicle 102 may include sensors 128 (and/or sensor devices). For example, the sensors 128 may include one or more cameras 128a and one or more LIDAR devices 128b. The vehicle 102 may use the camera(s) 128a to capture image data 130 of the environment 100. Furthermore, the vehicle 102 may use the LIDAR device(s) 128b to capture LIDAR data 132 of the environment 100.

In some examples, the vehicle 102 may include a vehicle computing system 134. The vehicle computing system 134 may include one or more components that cause the vehicle computing system 134 and/or the vehicle 102 to perform various operations. In various examples, the vehicle computing system 134 may include a semantic segmentation component 136 and/or a filter component 138. In some implementations, the vehicle computing system 134 may use the semantic segmentation component 136 and/or the filter component 138 to determine whether a LIDAR blob 140 (and/or a set of points of a 3D point cloud) represents a navigable surface for the vehicle 102, and/or to determine whether a LIDAR blob (and/or a set of points of a 3D point cloud) represents an obstacle to the vehicle 102. Additionally, or alternatively, the vehicle computing system 134 may use the semantic segmentation component 136 and/or the filter component 138 to filter out LIDAR data 132 (e.g., LIDAR data associated with a LIDAR blob 140) from data used to plan a trajectory and/or a route of the vehicle 102. For example, the LIDAR data 132 may be filtered out based on a determination that the LIDAR blob 140 represents a navigable space for the vehicle 102 and/or based on a determination that one or more safety conditions are satisfied, as described in further detail herein.

In some non-limiting examples, the vehicle 102 may capture LIDAR data 132 and determine that such data is associated with a LIDAR blob 140. The LIDAR blob 140 may include a set of points 142 (e.g., a cluster of adjacent LIDAR points associated with LIDAR returns). In some examples, one or more clustering techniques (e.g., techniques that include and/or use machine learning, deep learning, 3D segmentation, etc.) may be used to cluster the set of points 142 as the LIDAR blob 140.

In a non-limiting example, the vehicle 102 may use the LIDAR device(s) 128b to capture LIDAR data 132 associated with an exhaust cloud 144 that is emitted by another vehicle 146. The LIDAR data 132 may be associated with other types of matter in various examples. In some instances, the LIDAR data 132 may be associated with one or more types of particulate matter, such as exhaust (e.g., exhaust cloud 144), fog, steam, dust, etc., or otherwise which would not impact operations of the vehicle 102.

In some instances, the vehicle computing system 134 may perceive (e.g., based on the LIDAR data 132 alone) the LIDAR blob 140 to represent a potential obstacle to the vehicle 102, when, in reality, the vehicle 102 may be capable of safely traversing through the exhaust cloud 144. As such, LIDAR returns associated with the points 142 of the LIDAR blob 140 may not actually represent an obstacle to the vehicle 102, but rather may represent a navigable surface for the vehicle 102. Such LIDAR returns may be filtered out from data that is used to plan a trajectory and/or a route of the vehicle 102 in some embodiments.

In some examples, to facilitate discerning whether to incorporate LIDAR returns for planning (e.g., planning a trajectory and/or a route of the vehicle), the vehicle 102 may capture image data 130 associated with an image 148 of a portion of the environment 100 that includes at least a portion of the object(s) represented by the LIDAR blob 140. For example, the vehicle 102 may use the camera(s) 128a to capture the image data 130. In various embodiments, the image data 130 and the LIDAR data 132 may be captured substantially contemporaneously. The semantic segmentation component 136 may cause the vehicle computing system 134 to perform semantic segmentation on the image 148 to determine pixel classification probability distributions associated with pixels of the image. In at least some examples, such classifications may correspond to car, truck, bicycle, motorcycle, pedestrian, particulate matter, or the like, in addition to, navigable surface, free space, driveable surface, or otherwise.

According to some examples, the filter component 138 may cause the vehicle computing system 134 to query one or more of the pixel classification probability distributions and/or confidence scores associated with the pixel classification probability distributions. For instance, the filter component 138 may cause the vehicle computing system 134 to project, onto the image 148, data associated with points 142 of the LIDAR blob 140 to identify projected pixels, e.g., as described herein with reference to FIGS. 3, 4, 7, and 10. The filter component 138 may cause the vehicle computing system 134 to query pixel classification probability distributions based at least in part on the projected pixels. In some implementations, at least a portion of the environment may be voxelized to generate a 3D representation comprising voxels. Voxels may be used to aggregate data from a meta-scan (e.g., a collection of multiple LIDAR returns) of the environment, e.g., to provide better estimates with respect to measurements of objects in the environment. According to some examples, the filter component 138 may cause the vehicle computing system 134 to project, onto the image 148, voxels associated with points 142 of the LIDAR blob 140 to identify projected pixels. In at least some examples, LIDAR blob 140 may be determined in accordance with techniques taught in U.S. patent application Ser. No. 15/622,905 entitled "Voxel Based Ground Plane Estimation and Object Segmentation" filed on Jun. 14, 2017, the entire contents of which are hereby incorporated by reference.

In some embodiments, the filter component 138 may cause the vehicle computing system 134 to determine that the LIDAR blob 140 represents a navigable space for the vehicle 102. For example, the queried pixel classification probability distributions may be aggregated (e.g., over all LIDAR points and/or voxels associated with a blob) to determine a classification probability distribution for the LIDAR blob 140. The LIDAR blob 140 may be assigned to a class of object (or condition, such as navigable space or not) based on confidence scores associated with the classification probability distribution for the LIDAR blob 140. In some implementations, the LIDAR blob 140 may be assigned to a class of object associated with a navigable space (also referred to herein as "navigable space class"), e.g., based on the navigable space class being associated with a highest confidence score among the confidence scores associated with the classification probability distribution for the LIDAR blob. In some examples, the filter component 138 may cause the vehicle computing system 134 to determine that the LIDAR blob 140 represents a navigable space for the vehicle 102 based at least in part on the LIDAR blob 140 being assigned to the navigable space class. In at least some examples, e.g., those examples in which classifications comprise vehicles, pedestrians, etc., such a determination may be made that LIDAR blob 140 is not associated with any classification with a confidence over any threshold confidence level, or is associated with a particulate matter classification with a sufficiently high confidence level (e.g. over some threshold).

In various examples, the filter component 138 may cause the vehicle computing system 134 to filter out the LIDAR data 132 (associated with points 142 of the LIDAR blob 140) from data used to plan a trajectory and/or a route of the vehicle 102 based at least in part on the determination. For example, the LIDAR data 132 may be filtered out based at least in part on a determination that the LIDAR blob 140 represents a navigable space for the vehicle 102 and/or a determination that one or more safety conditions are satisfied, e.g., as described herein with reference to at least FIG. 8.

In some non-limiting examples, an object such as a plastic bag (not shown) may be determined to represent a navigable space for the vehicle 102. In a non-limiting example, the plastic bag may be sufficiently transparent that it is substantially invisible in an image (e.g., an image captured by a camera of the vehicle 102 and that includes the plastic bag), such that the plastic bag may be assigned to a class associated with free space. In another non-limiting example, the plastic bag may not be sufficiently transparent in the image, but may be classified as a plastic bag or otherwise classified as an object that is safe for the vehicle to traverse.

In some embodiments, the sensor(s) 128 may include light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, microphones, environment sensors (e.g., temperature sensors, humidity sensors, light sensors, pressure sensors, etc.), etc. The sensor(s) 128 can generate sensor data, which can be utilized by vehicle computing system 134 associated with the vehicle 102.

Figure 2:
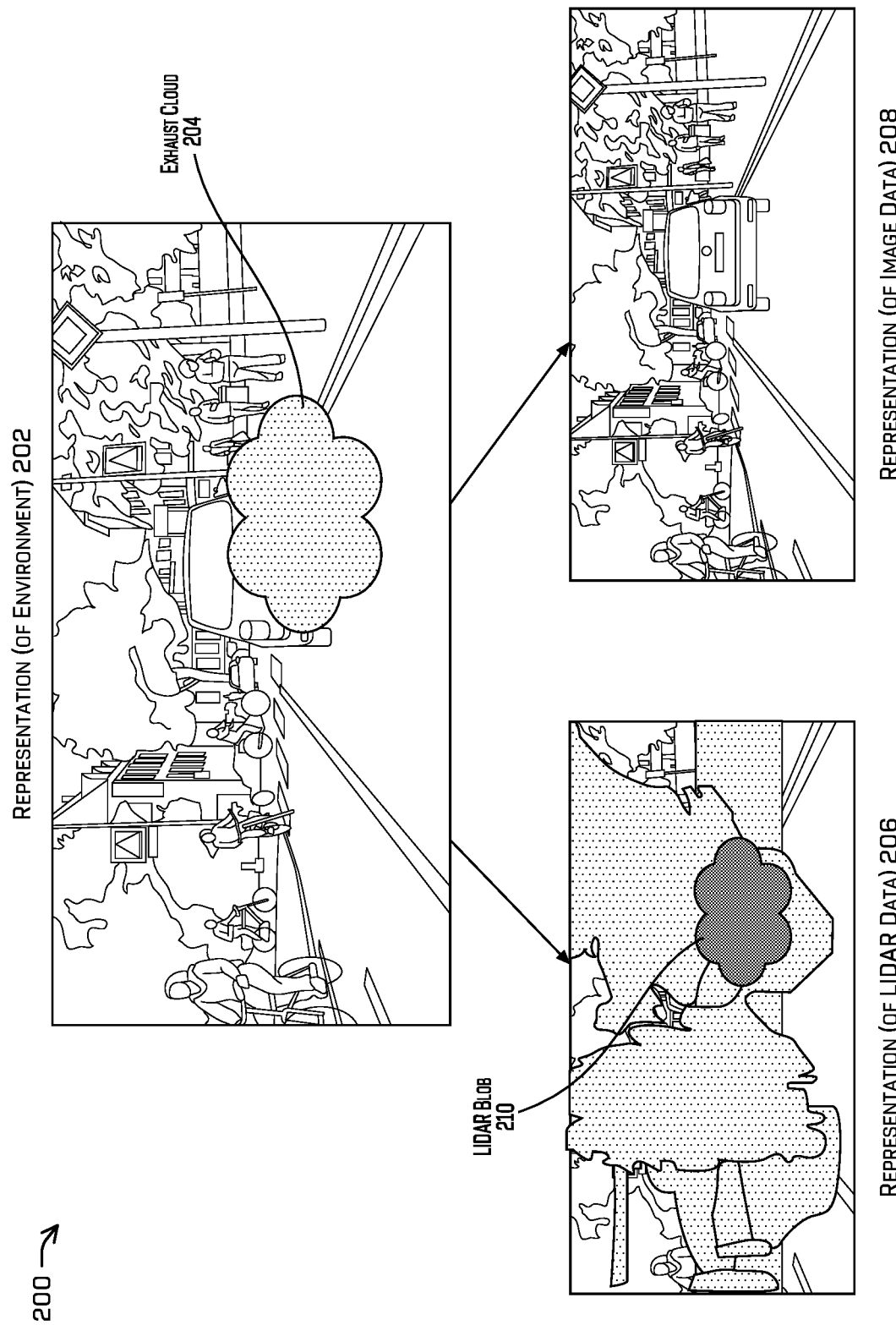
FIG. 2 is a schematic diagram illustrating an example of LIDAR data and image data that may be used for filtering LIDAR data with semantic segmentation, in accordance with embodiments of the disclosure.

FIG. 2 is a schematic diagram illustrating an example 200 of LIDAR data and image data that may be used (e.g., by a vehicle such as vehicle 102 described herein with reference to FIG. 1) for filtering LIDAR data with semantic segmentation, in accordance with embodiments of the disclosure. In some embodiments, the example 200 may include one or multiple features, components, and/or functionality of embodiments described herein with reference to FIGS. 1 and 3-11.

The example 200 includes a first representation 202 of a portion of an environment (e.g., the environment 100 of the vehicle 102 described herein with reference to FIG. 1). The representation 202 indicates that an exhaust cloud 204 is present in the environment. Furthermore, the example 200 includes a second representation 206 of LIDAR data (also referred to herein as "LIDAR data 206") and a third representation 208 of image data (also referred to herein as "image data 208"). As indicated in FIG. 2, the LIDAR data 206 and the image data 208 may be associated with the environment. In some examples, one or more LIDAR devices (and/or LIDAR sensors) may be used to capture the LIDAR data 206 associated with the environment. Furthermore, one or more cameras (and/or image sensors) may be used to capture image data 208 associated with the environment. In some implementations, the LIDAR data 206 may have a temporal association with the image data 208. For example, the LIDAR data 206 and the image data 208 may be captured substantially contemporaneously. In some embodiments, each of the LIDAR data 206 and the image data 208 may be associated with a respective time stamp, which may be compared with one another and/or against a threshold, e.g., to determine whether to associate the LIDAR data 206 with the image data 208.

As indicated in FIG. 2, the LIDAR data 206 includes a LIDAR blob 210. The LIDAR blob 210 may be associated with LIDAR returns from the exhaust cloud 204. In some examples, one or more clustering techniques (e.g., techniques that include and/or use machine learning, deep learning, segmentation, etc.) may be used to cluster a set of points (associated with LIDAR returns from the exhaust cloud 204) as the LIDAR blob 210. The image data 208, however, indicates a navigable space (and/or a free space, driveable space, etc.) where the exhaust cloud 204/LIDAR blob 210 are otherwise indicated. In this example 200, a vehicle may safely traverse the exhaust cloud 204, and thus it may be determined that the LIDAR blob 210 represents a navigable space for the vehicle. The LIDAR data 206 associated with the LIDAR blob 210 may be filtered out from data used to plan a trajectory and/or a route of the vehicle, in accordance with some embodiments disclosed herein.

Figure 3:
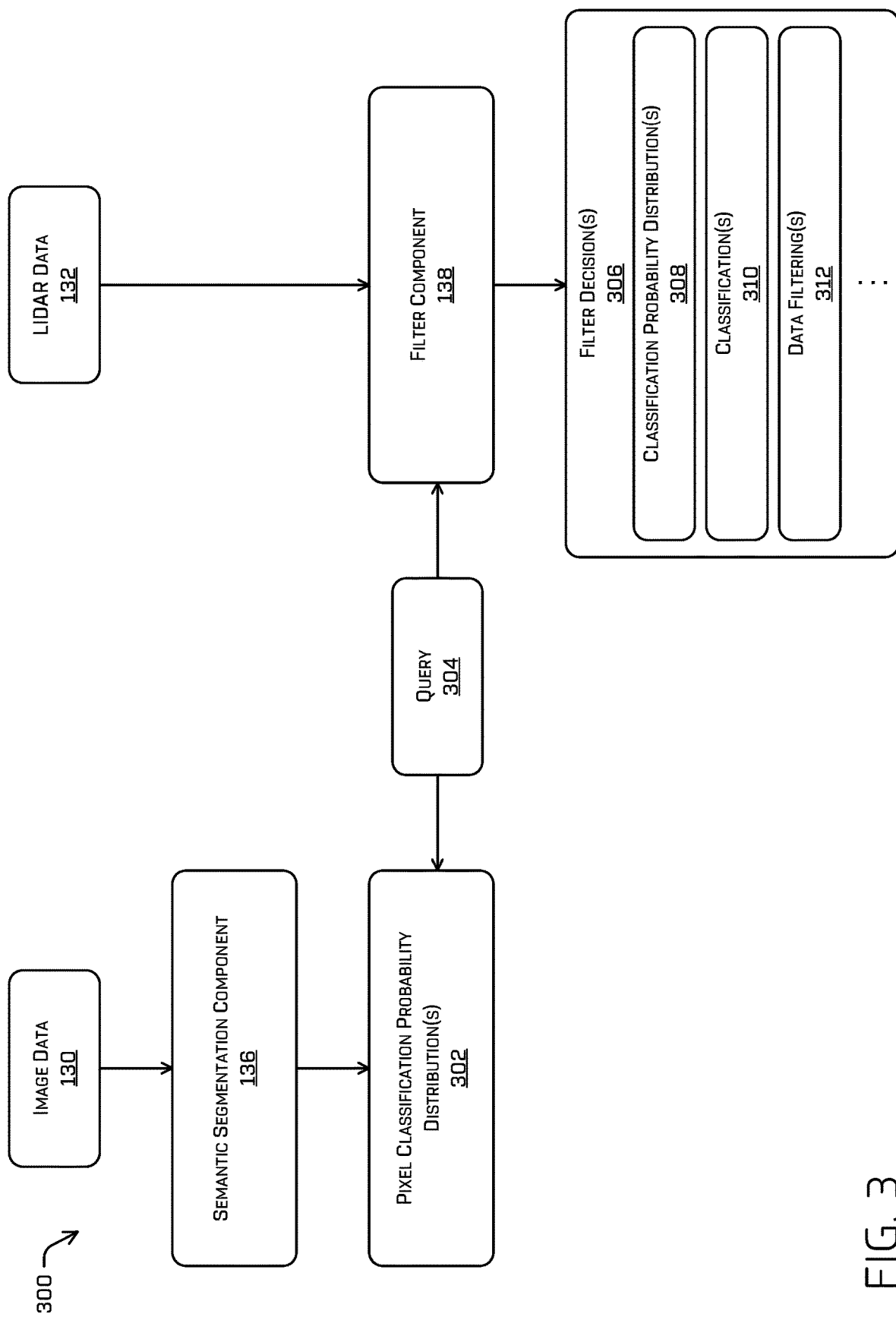
FIG. 3 is a block diagram illustrating an example process for filtering LIDAR data with semantic segmentation, in accordance with embodiments of the disclosure.

FIG. 3 is a block diagram illustrating an example process 300 for filtering LIDAR data with semantic segmentation, in accordance with embodiments of the disclosure. In some embodiments, the process 300 may include one or multiple features, components, and/or functionality of embodiments described herein with reference to FIGS. 1, 2, and 4-11.

In some embodiments, the process 300 may include the semantic segmentation component 136 receiving, as input, image data (e.g., the image data 130 described herein with reference to FIG. 1). The semantic segmentation component 136 may perform semantic segmentation on the image 130 and may output one or more pixel classification probability distributions 302. In some embodiments, the semantic segmentation component 136 may include one or more machine learning algorithms. For example, the semantic segmentation component 136 may include a convolutional neural network (CNN) configured to perform semantic segmentation on images and/or to determine pixel classification probability distributions for pixels of images, though any other form of semantic segmentation on the image is contemplated.

In some examples, the process 300 may include the filter component 138 receiving, as input, LIDAR data (e.g., the LIDAR data 132 described herein with reference to FIG. 1). Furthermore, the filter component 138 may receive, as input, one or more pixel classification probability distributions 302. In some implementations, the filter component 138 may query 304 (or look up) one or more of the pixel classification probability distributions 302. For instance, the LIDAR filter component 138 may query 304 pixel classification probability distribution(s) 302 based at least in part on a projection, as projected pixels onto an image (e.g., an image associated with the image data 130), of data associated with points of a LIDAR blob (e.g., a LIDAR blob associated with the LIDAR data 132), e.g., as described herein with reference to at least FIG. 4. In some examples, one or more clustering techniques (e.g., techniques that include and/or use machine learning, deep learning, segmentation, etc.) may be used to cluster a set of points as a LIDAR blob. In various embodiments, the query 304 may include a query for pixel classification probability distribution(s) 302 based at least in part on the projected pixels. In some implementations, clustering of the set of points as a LIDAR blob may be performed during a time period that occurs before querying 304 for pixel classification probability distribution(s) 302. However, clustering of the set of points as a LIDAR blob may be performed during any other suitable time period, e.g., a time period that occurs after querying 304 for pixel classification probability distribution(s) 302 and/or a time period that occurs after filtering out a set of LIDAR points.

In some embodiments, the filter component 138 may output one or more filter decisions 306. According to some examples, the filter decision(s) 306 may include one or more classification probability distributions 308 (e.g., classification probability distributions for LIDAR blobs), one or more classifications 310 (e.g., classifications for LIDAR blobs), and/or one or more data filterings 312 (e.g., subtracting, discarding, and/or ignoring, etc., LIDAR data from data used to plan a trajectory and/or a route of a vehicle).

In some examples, the classification probability distribution(s) 308 may be determined based at least in part on the queried pixel classification probability distribution(s) 302. For example, the queried pixel classification probability distribution(s) 302 may be aggregated (e.g., by performing a weighted average over all points or voxels associated with a LIDAR blob), and a classification probability distribution 308 may be determined based at least in part on the aggregation of the queried pixel classification probability distribution(s) 302.

In some examples, the classification(s) 310 may be associated with an assignment of a LIDAR blob to a class of object. The class to which a LIDAR blob is assigned may be determined based at least in part on a classification probability distribution 308 for the LIDAR blob. In a non-limiting example, the LIDAR blob may be assigned to a class associated with a highest confidence score (among confidence scores associated with the classification probability distribution 308).

In some examples, the data filtering(s) 312 may be associated with LIDAR data 132 being discarded from data (e.g., data used to plan a trajectory and/or a route of an autonomous vehicle). In some embodiments, discarding data may include subtracting the data, labeling the data (e.g., as data to be ignored for certain purposes), and/or ignoring the data. According to some embodiments, LIDAR data 132 associated with a LIDAR blob may be discarded (or otherwise ignored) from data based at least in part on the classification probability distribution(s) 308 and/or the classification(s) 310 for the LIDAR blob. In a non-limiting example, the LIDAR blob may be assigned to a class of object associated with a navigable space. As such, it may be determined that the LIDAR blob represents a navigable space for a vehicle and/or that the LIDAR blob does not represent an obstacle to the vehicle. In this example, the filter component 138 may output a filter decision 306 that includes a data filtering 312 in which the LIDAR data 132 associated with the LIDAR blob is discarded from the data used to plan a trajectory and/or a route of the autonomous vehicle.

Figure 4:
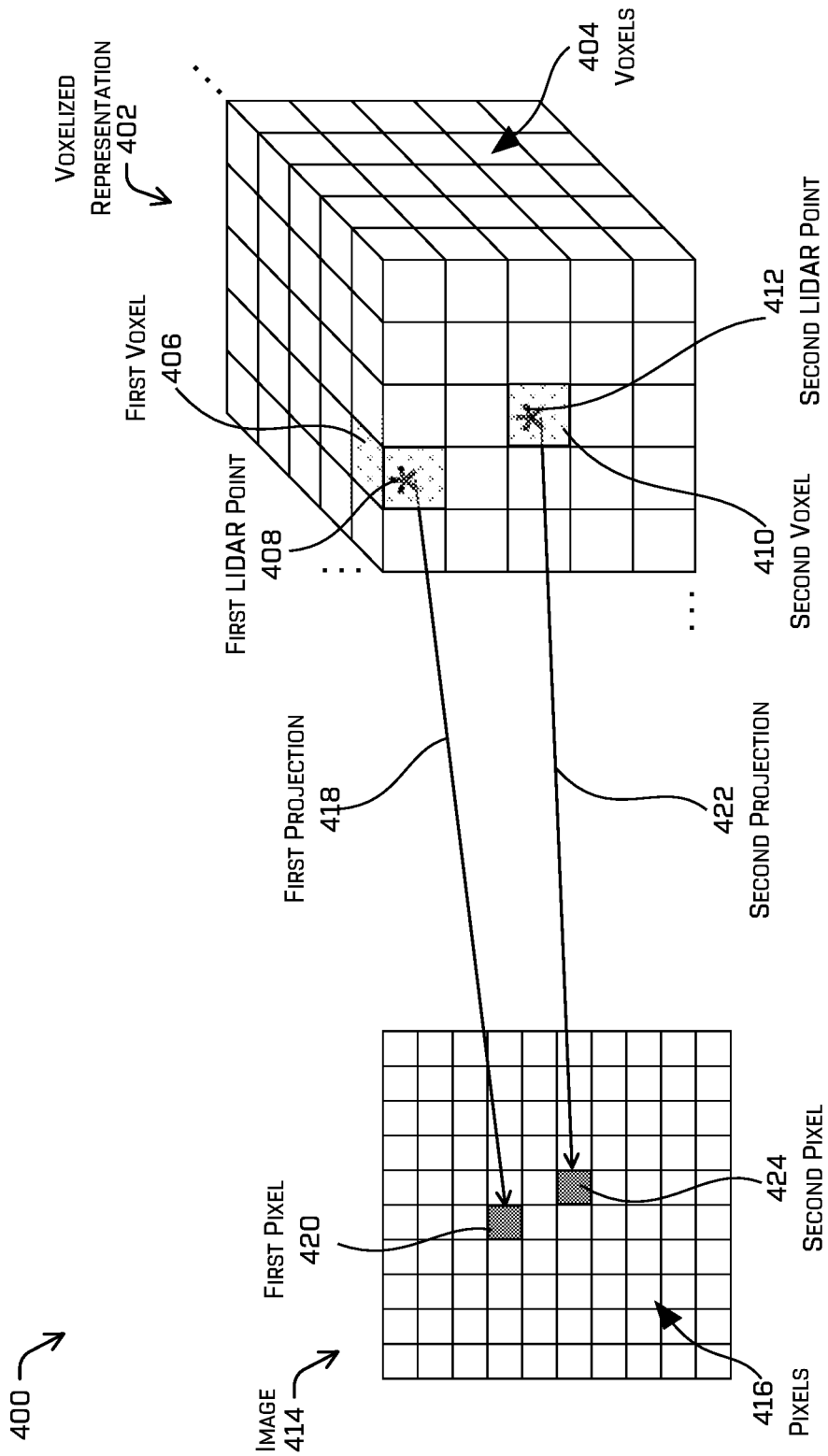
FIG. 4 illustrates an example projection of voxels onto an image, in accordance with embodiments of the disclosure. In some examples, the voxels may be associated with points of a LIDAR blob, and the projection may be used to identify pixels of the image that correspond to voxels associated with points of the LIDAR blob.

FIG. 4 illustrates an example projection 400 of voxels onto an image, in accordance with embodiments of the disclosure. In some examples, the voxels may be associated with points of a LIDAR blob, and the projection may be used to identify pixels of the image that correspond to voxels associated with points of the LIDAR blob. In some embodiments, the projection 400 may include one or multiple features, components, and/or functionality of embodiments described herein with reference to FIGS. 1-3 and 5-11.

In some examples, a portion of an environment may be voxelized to generate a three-dimensional (3D) voxelized representation 402 comprising voxels 404. The voxels 404 may include a first voxel 406 associated with a first LIDAR point 408 of a LIDAR blob, e.g., as indicated in FIG. 4. Furthermore, the voxels 404 may include a second voxel 410 associated with a second LIDAR point 412 of the LIDAR blob, e.g., as indicated in FIG. 4. Voxels may be used to aggregate data from a meta-scan (e.g., a collection of multiple LIDAR sensor returns) of the environment, e.g., to provide better estimates with respect to detected objects. While this projection 400 describes projecting voxels onto an image, any other data associated with LIDAR points may be projected onto the image (e.g., raw data points themselves acquired from a single LIDAR scan).

According to various examples, one or more voxels 404 (or LIDAR points individually) associated with LIDAR points of the LIDAR blob may be projected onto an image 414 (e.g., the image 146 associated with the image data 130 described herein with reference to FIG. 1) to identify one or more pixels 416 that are associated with the projected voxels (and/or with the LIDAR points associated with the projected voxels). For example, the first voxel 406 (associated with the first LIDAR point 408) may be projected onto the image 414 via a first projection 418. The first projection 418 may be used to identify a first pixel 420 associated with the first voxel 406. Furthermore, the second voxel 410 (associated with the second LIDAR point 412) may be projected onto the image 414 via a second projection 422. The second projection 422 may be used to identify a second pixel 424 associated with the second voxel 410. In various embodiments, pixel classification probability distributions (and/or confidence scores associated with the pixel classification probability distributions) may be queried for the first pixel 420 and the second pixel 424 based on those pixels being identified as pixels that are associated with LIDAR point of the LIDAR blob, in the projection 400.

Figure 5:
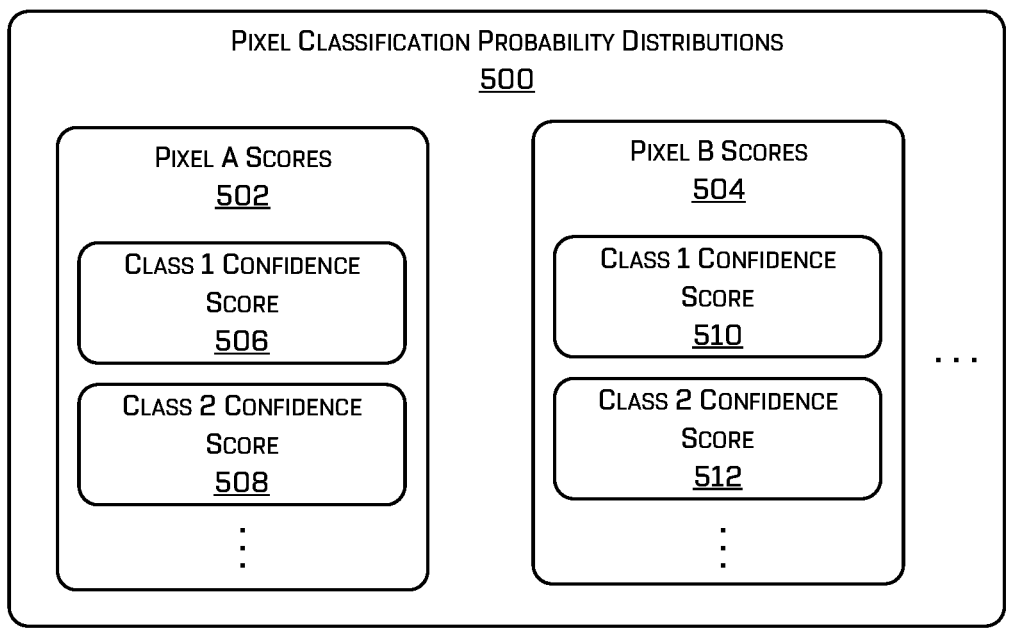
FIG. 5 is a block diagram illustrating example pixel classification probability distributions that may be used for filtering LIDAR data with semantic segmentation, in accordance with embodiments of the disclosure.

FIG. 5 is a block diagram illustrating example pixel classification probability distributions 500 that may be used for filtering LIDAR data with semantic segmentation, in accordance with embodiments of the disclosure. In some embodiments, the pixel classification probability distributions 500 may include one or multiple features, components, and/or functionality of embodiments described herein with reference to FIGS. 1-4 and 6-11.

In some examples, the pixel classification probability distributions 500 may include a respective set of confidence scores for respective pixels. For example, the pixel classification probability distributions 500 may include pixel A confidence scores 502, pixel B confidence scores 504, etc. The pixel A confidence scores 502 may include a class 1 confidence score 506, a class 2 confidence score 508, etc. The pixel B confidence scores 504 may include a class 1 confidence score 510, a class 2 confidence score 512, etc. Each of the confidence scores may be associated with a probability that a particular pixel belongs to a particular class of object. As a non-limiting example with respect to the pixel A scores 502, the class 1 confidence score 506 may be associated with an 80% probability that pixel A belongs to a navigable space class (a class of object associated with a navigable space), the class 2 confidence score 508 may be associated with a 20% probability that pixel A belongs to a vehicle class (a class of object associated with vehicles), and so on, though any other classification is contemplated. As a non-limiting example with respect to the pixel B scores 504, the class 1 confidence score 510 may be associated with a 90% probability that pixel B belongs to the navigable space class, the class 2 confidence score 512 may be associated with a 5% probability that pixel B belongs to the vehicle class, and so on. In some examples, the classes of objects that may be accounted for in the pixel classification probability distributions 500 may include, but are not limited to, a class associated with static objects, a class associated with vehicles, a class associated with pedestrians, a class associated with two-wheeled vehicles (e.g., bicycles, motorcycles, etc.), a class associated with movable objects (e.g., cones, trash cans, etc.), and/or a class associated with a navigable space.

In some embodiments, a determination may be made as to whether to filter out LIDAR data from data used to plan a trajectory and/or a route of a vehicle. The determination may be based at least in part on pixel classification probability distributions, such as the pixel classification probability distributions 500 described herein.

Figure 6:
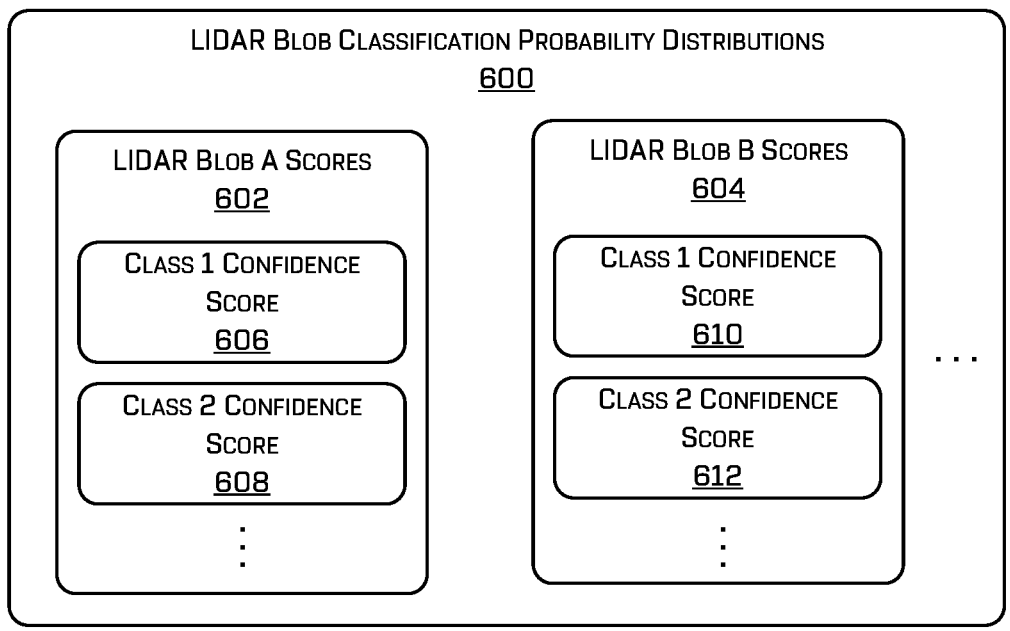
FIG. 6 is a block diagram illustrating example LIDAR classification probability distributions used for filtering LIDAR data with semantic segmentation, in accordance with embodiments of the disclosure.

FIG. 6 is a block diagram illustrating example LIDAR blob classification probability distributions 600 (also referred to herein as "blob classification probability distributions") used for filtering LIDAR data with semantic segmentation, in accordance with embodiments of the disclosure. In some embodiments, the LIDAR blob classification probability distributions 600 may include one or multiple features, components, and/or functionality of embodiments described herein with reference to FIGS. 1-5 and 7-11.

In some examples, the blob classification probability distributions 600 may include a respective set of confidence scores for respective LIDAR blobs. For example, the blob classification probability distributions 600 may include LIDAR blob A confidence scores 602, LIDAR blob B confidence scores 604, etc. The LIDAR blob A confidence scores 602 may include a class 1 confidence score 606, a class 2 confidence score 608, etc. The LIDAR blob B confidence scores 604 may include a class 1 confidence score 610, a class 2 confidence score 612, etc. Each of the confidence scores may be associated with a probability that a particular LIDAR blob belongs to a particular class of object. As a non-limiting example with respect to the LIDAR blob A scores 602, the class 1 confidence score 606 may be associated with a 100% probability that LIDAR blob A belongs to the navigable space class, the class 2 confidence score 608 may be associated with a 0% probability that LIDAR blob A belongs to the vehicle class, and so on. As a non-limiting example with respect to the LIDAR blob B scores 604, the class 1 confidence score 610 may be associated with a 90% probability that LIDAR blob B belongs to the navigable space class, the class 2 confidence score 612 may be associated with a 10% probability that LIDAR blob B belongs to the vehicle class, and so on. In some examples, the classes of objects that may be accounted for in the blob classification probability distributions 600 may include, but are not limited to, a class associated with static objects, a class associated with vehicles, a class associated with pedestrians, a class associated with two-wheeled vehicles (e.g., bicycles, motorcycles, etc.), a class associated with movable objects (e.g., cones, trash cans, etc.), and/or a class associated with a navigable space.

In some embodiments, a determination may be made as to whether to filter out LIDAR data from data used to plan a trajectory and/or a route of a vehicle. The determination may be based at least in part on a blob classification probability distribution for a LIDAR blob, such as a blob classification probability distribution 600 described herein. In some non-limiting examples, the determination may be based at least in part on a first probability that the LIDAR blob belongs to a first set of one or more classes (e.g., a navigable space class, a free space class, and/or a driveable surface class, etc.) satisfying a first "high probability" threshold (e.g., 90%, 95%, etc.) Additionally, or alternatively, the determination may be based at least in part on a second probability that the LIDAR blob belongs to a second set of one or more classes (e.g., a vehicle class, a pedestrian class, and/or a two-wheeled vehicle class, etc.) satisfying a second "low probability" threshold (e.g., 1%, 0.7%, etc.).

Figure 7:
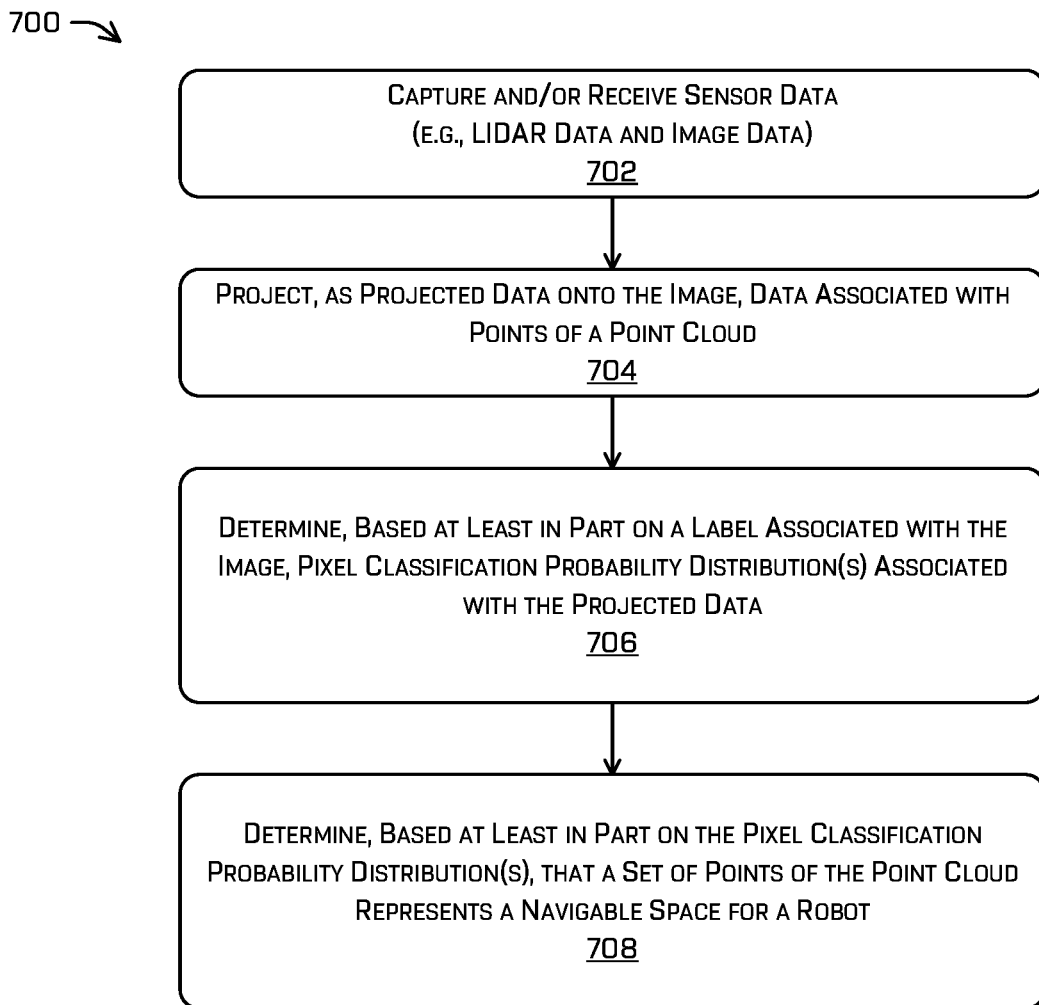
FIG. 7 is a flow chart illustrating an example process for determining whether a portion of three-dimensional (3D) data, such as a blob of point cloud, represents an obstacle to a robot, in accordance with embodiments of the disclosure. In some examples, the process may be used for filtering LIDAR data with semantic segmentation, in accordance with embodiments of the disclosure.

FIG. 7 is a flow chart illustrating an example process 700 for determining whether a set of points of a three-dimensional (3D) point cloud represents a navigable surface for a robot (e.g., an autonomous vehicle), in accordance with embodiments of the disclosure. In some examples, the process 700 may be used for filtering point cloud data with semantic segmentation, in accordance with embodiments of the disclosure. In some embodiments, the process 700 may include one or multiple features, components, and/or functionality of embodiments described herein with reference to FIGS. 1-6 and 8-11.

At 702, the process 700 may include capturing and/or receiving sensor data. For instance, a robot may capture and/or receive 3D point cloud data (e.g., LIDAR data) via one or more sensors (e.g., a LIDAR sensor). Furthermore, the robot may capture and/or receive image data via one or more sensors (e.g., a camera). The 3D point cloud data may comprise data associated with a set of points of the 3D point cloud in an environment of the robot. The image data may be associated with an image of a portion of the environment that includes at least a portion of the object(s) represented by the 3D point cloud. In at least some examples, the image data may be captured substantially simultaneously with the LIDAR data.

At 704, the process 700 may include projecting, as projected data onto an image, data associated with the set of points of the 3D point cloud. For example, voxels associated with the set of points may be projected onto the image as in the projection 400 (e.g., the first projection 418) described herein with reference to FIG. 4. In some examples, a statistically significant number of voxels associated with the set of points may be projected (e.g., such that not all voxels need to be projected) such that a significantly high enough confidence determination can be made with respect to a class associated with the set of points.

At 706, the process 700 may include determining, based at least in part on a label associated with the image, pixel classification probability distribution(s) associated with the projected data. For example, the pixel classification probability distribution(s) associated with the projected data may be determined based at least in part on a semantic segmentation of the image. In some examples, the pixel classification probability distribution(s) may be associated with confidence scores (e.g., as in the pixel classification probability distributions 500 described herein with reference to FIG. 5).

At 708, the process 700 may include determining, based at least in part on the pixel classification probability distribution(s), that the set of points represents a navigable space for the robot. In some examples, the set of points may be clustered, e.g., as a blob. According to some implementations, one or more clustering techniques (e.g., techniques that include machine learning, deep learning, etc.) may be used to cluster the set of points as a blob. In some implementations, clustering of the set of points as a blob may be performed during a time period that occurs before determining pixel classification probability distribution(s) (at 706). However, clustering of the set of points as a blob may be performed during any other suitable time period, e.g., a time period that occurs after determining pixel classification probability distribution(s) (at 706) and/or a time period that occurs after filtering out data using techniques disclosed herein.

Figure 8:
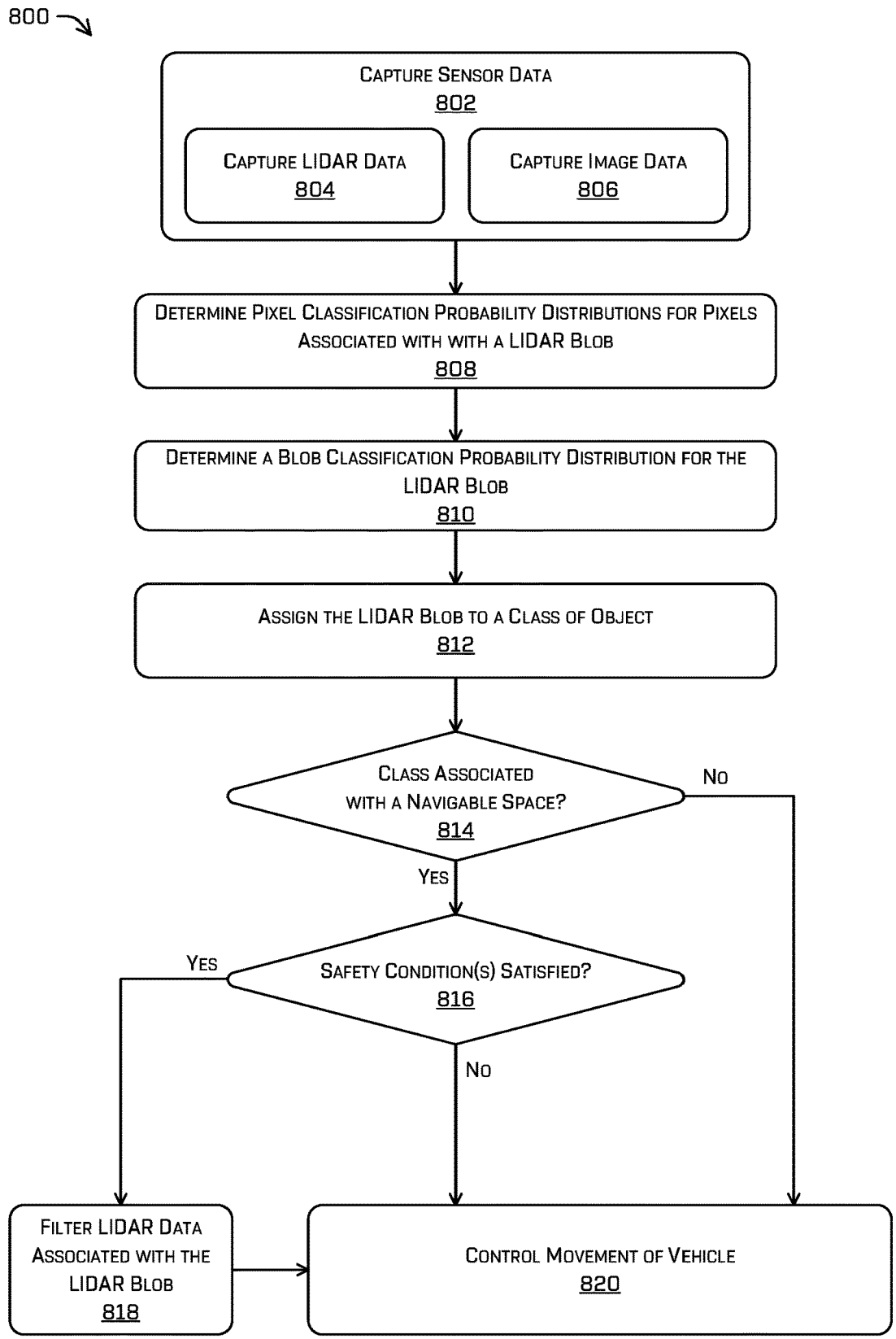
FIG. 8 is a flow chart illustrating an example process for filtering LIDAR data with semantic segmentation, in accordance with embodiments of the disclosure.

FIG. 8 is a flow chart illustrating an example process 800 for filtering LIDAR data with semantic segmentation, in accordance with embodiments of the disclosure. In some embodiments, the process 800 may include one or multiple features, components, and/or functionality of embodiments described herein with reference to FIGS. 1-7 and 9-11.

At 802, the process 800 may include capturing sensor data. In various examples, capturing sensor data (at 802) may include capturing LIDAR data (at 804) and/or capturing image data (at 806). For example, a vehicle (e.g., an autonomous vehicle) may have one or more LIDAR devices for capturing the LIDAR data. Furthermore, the vehicle may have one or more cameras for capturing the image data. The LIDAR data may be associated with points of a LIDAR blob in an environment of the vehicle, e.g., as determined by one or more computer systems associated with the vehicle. The image data may be associated with an image of a portion of the environment that includes at least a portion of object(s) represented by the LIDAR blob.

At 808, the process 800 may include determining pixel classification probability distributions for pixels associated with a LIDAR blob. In some examples, the pixel classification probability distributions may be associated with confidence scores (e.g., as in the pixel classification probability distributions 500 described herein with reference to FIG. 5).

At 810, the process 800 may include determining a blob classification probability distribution for the LIDAR blob. In some examples, the blob classification probability distribution may be associated with confidence scores (e.g., as in the LIDAR blob classification probability distributions 600 described herein with reference to FIG. 6). In some implementations, confidence scores associated with the pixel classification probability distributions may be aggregated, and the blob classification probability distribution may be determined based at least in part on the aggregation of the confidence scores associated with the pixel classification probability distributions.

At 812, the process 800 may include assigning the LIDAR blob to a class of object. For example, the LIDAR blob may be assigned to a class associated with a highest confidence score among confidence scores associated with the LIDAR blob classification probability distribution.

In a non-limiting example, the LIDAR blob may be assigned to a class based at least in part on a first score (received from a machine learning algorithm) and a second score (determined based at least in part on a semantic segmentation of the image). In this example, the process 800 may include inputting, into the machine learning algorithm, LIDAR data associated with the points of the LIDAR blob. The first score may be received as output from the machine learning algorithm. The first score may be associated with a first probability that the LIDAR blob belongs to a first class of object. In some examples, the machine learning algorithm may include one or more components of the machine learning algorithms discussed in U.S. application Ser. No. 15/963,833, which is herein incorporated by reference in its entirety. Furthermore, in this example, the LIDAR blob classification probability distribution may include a second score associated with a second probability that the LIDAR blob belongs to a second class of object that is different than the first class of object. In some cases, the first score may be compared with the second score and/or with a threshold. For example, the process 800 may include determining which of the first score and the second score is higher. Additionally, or alternatively, the process 800 may include determining that a difference between the first score and the second score satisfies a threshold difference. In some implementations, the LIDAR blob may be assigned to the second class of object, e.g., based at least in part on determining that the difference between the first score and the second score satisfies the threshold difference.

At 814, the process 800 may include determining whether the assigned class is associated with a navigable space. If it is determined (at 814) that the assigned class is associated with a navigable space, then the process 800 may include determining whether one or more safety conditions are satisfied, at 816.

In some examples, the safety condition(s) may include a first condition that a distance, between the LIDAR blob and the vehicle, satisfies a threshold distance. As a non-limiting example, the threshold distance may be 15 meters in front of the vehicle. In this example, to satisfy the threshold distance of the first condition, the distance between the vehicle and the LIDAR blob (in front of the vehicle) must be 15 meters or less. In some examples, the first condition may include multiple different threshold distances. For instance, the first condition may include a first threshold distance with respect to LIDAR returns from objects in front of the vehicle and a second threshold distance with respect to LIDAR returns from objects to either side of the vehicle. In some examples, the second threshold distance may be a different value than the first threshold distance. In other examples, the second threshold distance may be the same value as the first threshold distance.

Additionally, or alternatively, the safety condition(s) may include a second condition that a speed of the vehicle satisfies a threshold speed. As a non-limiting example, the threshold speed may be 10 mph. In this example, to satisfy the threshold speed of the second condition, the speed of the vehicle must be 10 mph or less.

Additionally, or alternatively, the safety condition(s) may include a third condition that an amount of the LIDAR blob, that is projected (via corresponding voxels) onto the image, satisfies a threshold amount. As a non-limiting example, the threshold amount may be 100%. In this example, to satisfy the threshold amount of the third condition, all (100%) points of the LIDAR blob must be projected onto the image.

Additionally, or alternatively, the safety condition(s) may include a fourth condition that a confidence level, associated with the LIDAR blob belonging to the driveable surface class, satisfies a threshold confidence level. As a non-limiting example, the threshold confidence level may be 100%. In this example, to satisfy the confidence level threshold of the fourth condition, the vehicle (and/or a computing system associated with the vehicle) must have a confidence level of 100% that the LIDAR blob belongs to the driveable surface class. If it is determined (at 816) that the safety condition(s) are satisfied, then the process 800 may include filtering (e.g., subtracting, discarding, labeling, and/or ignoring, etc.) LIDAR data associated with the LIDAR blob. In some non-limiting examples, multiple safety conditions may be checked against, and satisfaction of any one of them may be considered as generally satisfying the safety conditions for the purposes of filtering. In some non-limiting examples, multiple safety conditions may be checked against, and satisfaction of one or more particular combinations of them may be considered as generally satisfying the safety conditions for the purposes of filtering. In some non-limiting examples, multiple safety conditions may be checked against, and satisfaction of all of them may be required to be considered as satisfying the safety conditions for the purposes of filtering. In some non-limiting examples, a single safety condition may be checked against, the satisfaction of which may be required for the purposes of filtering. In at least some example, the satisfaction of one safety condition may impact any other safety condition. As a non-limiting example, a confidence threshold may be lowered for excluding data if the vehicle is moving sufficiently slowly and/or the object is sufficiently far away, though any other association of the safety conditions are contemplated.

In various implementations, the LIDAR data associated with the LIDAR blob may be filtered out from data used to plan a trajectory and/or a route of a vehicle. In some examples, the LIDAR blob data may be subtracted from (or otherwise ignored relative to) the data used to plan a trajectory and/or a route of the vehicle based at least in part on a determination that the LIDAR blob represents a navigable space and/or based at least in part on a determination that the safety condition(s) are satisfied.

At 820, the process 800 may include controlling movement of the vehicle. For example, movement of the vehicle may be controlled based at least in part on the data used to plan the trajectory and/or the route of the vehicle.

If it is determined (at 814) that the assigned class is not associated with a navigable space, then the process 800 may proceed to controlling movement of the vehicle, at 820. In such cases, LIDAR data associated with the LIDAR blob may not be filtered out from the data used to plan the trajectory and/or the route of the vehicle.

Furthermore, if it is determined (at 816) that the safety condition(s) are not satisfied, then the process 800 may proceed to controlling movement of the vehicle, at 820. In such cases, LIDAR data associated with the LIDAR blob may not be filtered out from data used to plan the trajectory and/or the route of the vehicle.

Figure 9:
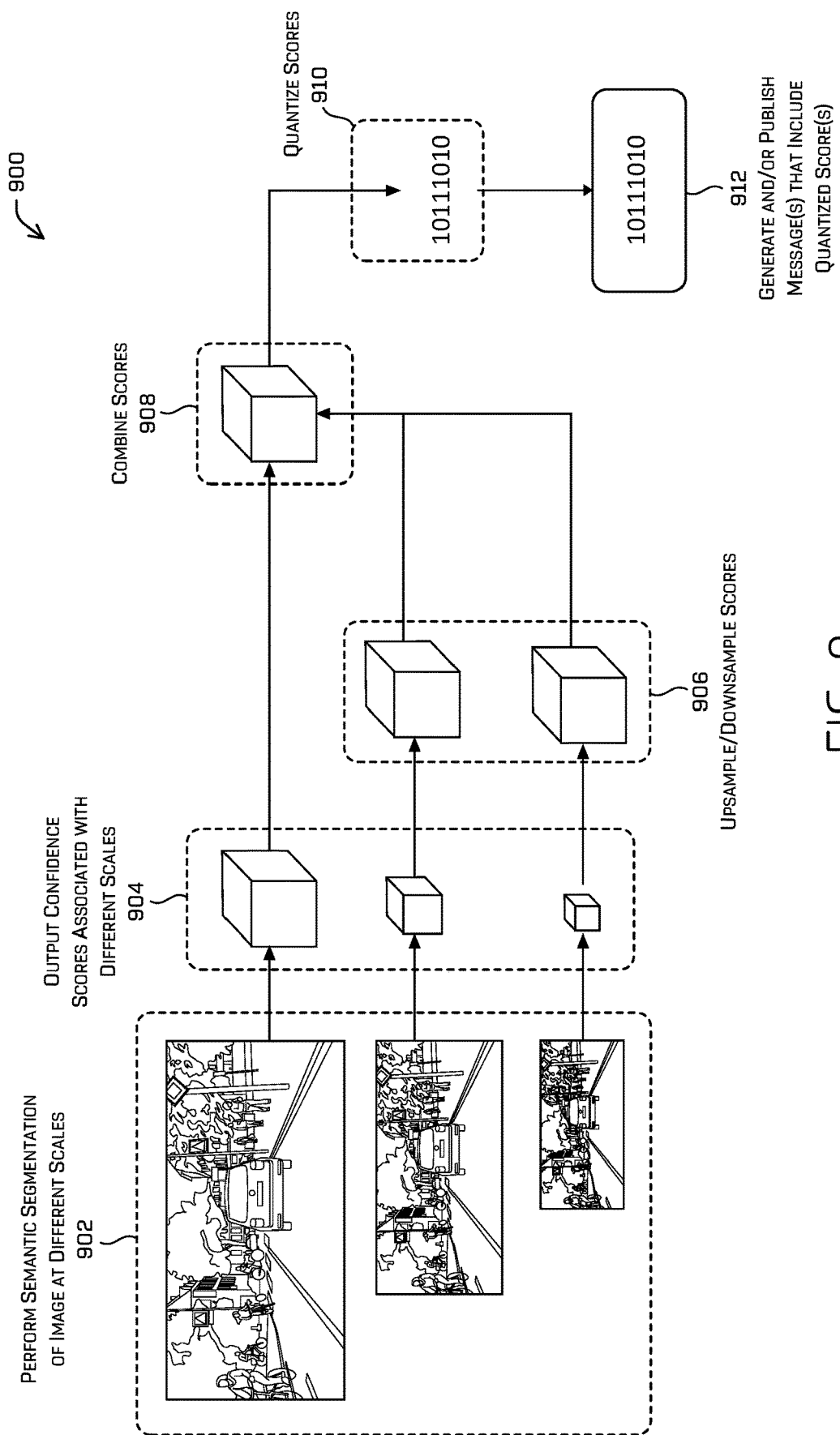
FIG. 9 is a schematic diagram illustrating an example data processing technique that may be used in a pipeline that includes filtering LIDAR data with semantic segmentation, in accordance with embodiments of the disclosure.

FIG. 9 is a schematic diagram illustrating an example data processing technique 900 that may be used in a pipeline that includes filtering LIDAR data with semantic segmentation, in accordance with embodiments of the disclosure. In some embodiments, the data processing technique 900 may include one or multiple features, components, and/or functionality of embodiments described herein with reference to FIGS. 1-8, 10, and 11.

At 902, the data processing technique 900 may include performing semantic segmentation of an image at different scales. For example, a convolutional neural network (or other machine learning component) may receive, as input, image data associated with the image at different scales. Inputting the image data at different scales may provide different ranges of valid outputs based on the receptive field of the network, and thus the network may provide better information about the image data than it would otherwise provide with an input at a single scale.

At 904, the data processing technique 900 may include outputting confidence scores associated with different scales. For example, the convolutional neural network may output the confidence scores at different scales. In a non-limiting example, each of the confidence scores may be scaled at a fraction (e.g., $\frac{1}{8}$) of the scale of the corresponding image passed into the convolutional neural network. In another non-limiting example, each of the confidence scores may be at a same scale as the corresponding image passed into the neural network, but the confidence scores may be at different scales from one another.

At 906, the data processing technique 900 may include upsampling and/or downsampling one or more of the confidence scores. For example, one or more of the confidence scores may be bilinearly upsampled to a particular fraction (e.g. $\frac{1}{8}$) of the largest scale at which the image was passed into the convolutional neural network.

At 908, the data processing technique 900 may include combining the confidence scores. In some examples, one or more confidence scores that were not upsampled or downsampled may be combined with one or more other confidence scores that were upsampled and/or downsampled. The confidence scores may be renormalized before or after summing.

At 910, the data processing technique 900 may include quantizing confidence scores. In some examples, the confidence scores may be quantized into bytes. In some implementations, one or more confidence scores may be quantized into a single byte, which may achieve a reduction in memory, processing time, etc.

At 912, the data processing technique 900 may include generating and/or publishing one or more messages that include one or more quantized confidence scores. In some examples, the message(s) may be stored in cache, and the cache may be emptied in certain instances, e.g., prior to running a tracker component of the vehicle that tracks movement of objects.

Figure 10:
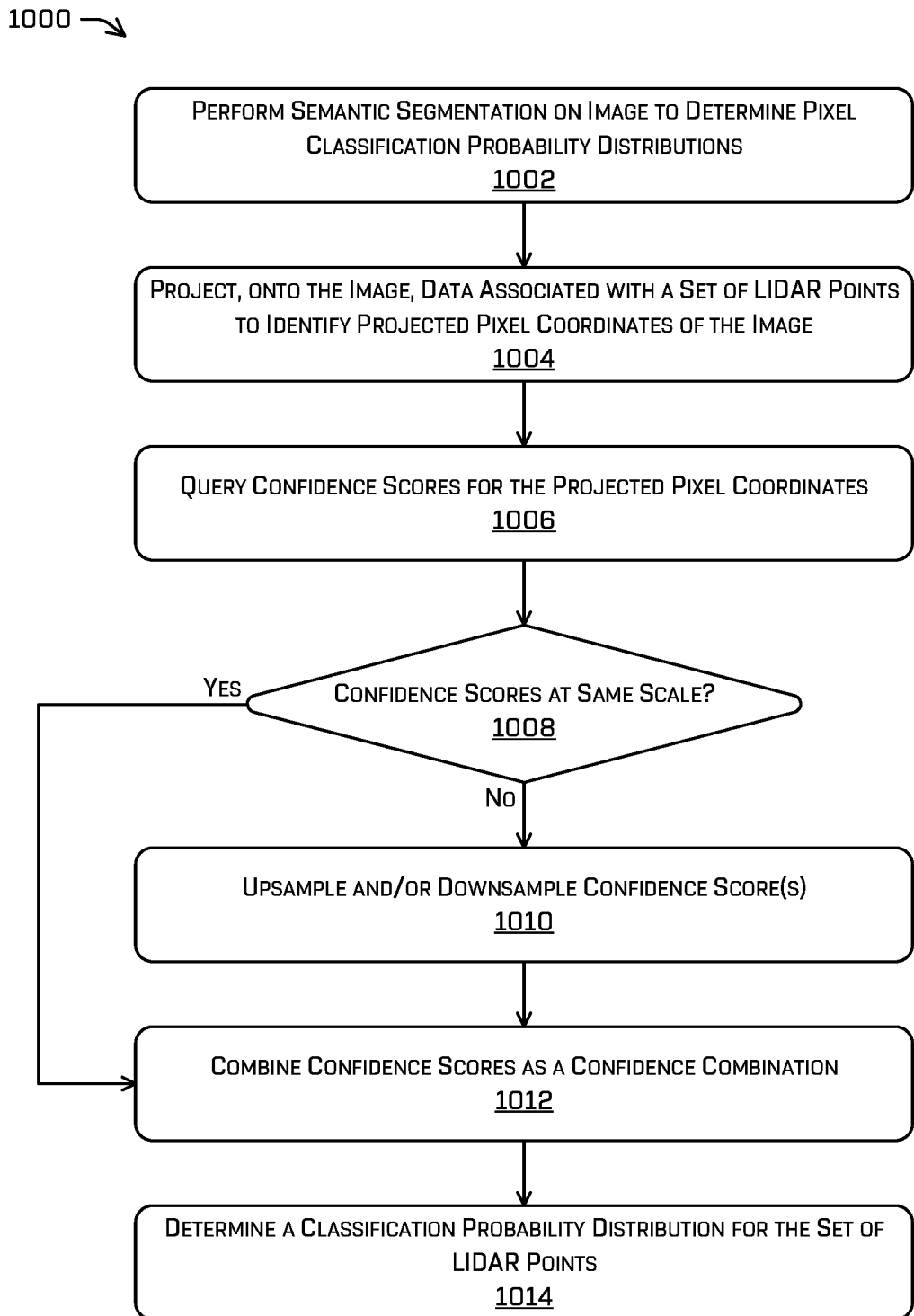
FIG. 10 is a flow chart illustrating an example process for determining a blob classification probability distribution for a LIDAR blob, in accordance with embodiments of the disclosure. In some examples, the blob classification probability distribution may be used for filtering LIDAR data with semantic segmentation, in accordance with embodiments of the disclosure.

FIG. 10 is a flow chart illustrating an example process 1000 for determining a classification probability distribution for a set of LIDAR points, in accordance with embodiments of the disclosure. In some examples, the classification probability distribution may be used for filtering LIDAR data with semantic segmentation, in accordance with embodiments of the disclosure. In some embodiments, the process 1000 may include one or multiple features, components, and/or functionality of embodiments described herein with reference to FIGS. 1-9 and 11.

At 1002, the process 1000 may include performing semantic segmentation on an image to determine pixel classification probability distributions. For example, the semantic segmentation may be performed on the image at multiple scales, as discussed herein with reference to FIG. 9. In some examples, the pixel classification probability distributions may be associated with confidence scores (e.g., as in the pixel classification probability distributions 500 described herein with reference to FIG. 5).

In some implementations, the image may be passed into a first machine learned algorithm trained to output confidence scores for corresponding pixels in the image belonging to one or more classifications. The image may be scaled, and the scaled image may be passed into a second machine learned algorithm trained to output confidence scores for corresponding pixels in the scaled image belonging to the classification(s). In some examples, the first machine learned algorithm may be the second machine learned algorithm (i.e. a single machine learned algorithm is used). In other examples, the first machine learned algorithm and the second machine learned algorithm may be different algorithms.

At 1004, the process 1000 may include projecting, onto the image, data associated with points of a LIDAR blob to identify projected pixel coordinates of the image. For example, voxels associated with the set of LIDAR points may be projected onto the image as in the projection 400 described herein with reference to FIG. 4.

At 1006, the process 1000 may include querying confidence scores for the projected pixel coordinates. In a non-limiting example, the process 1000 may include querying a first confidence score associated with a first scale, and a second confidence score associated with a second scale.

At 1008, the process 1000 may include determining whether the confidence scores are at a same scale. If it is determined (at 1008) that the confidence scores are not at a same scale, then the process 1000 may include upsampling and/or downsampling one or more confidence scores, at 1010. For example, the second confidence score (associated with a second scale) may be upsampled or downsampled to the first scale to generate an upsampled or downsampled second confidence score that is at the same scale as the first confidence score. In various examples, the first confidence score and/or the second confidence score may be upsampled and/or downsampled to generate one or more scaled confidence scores. In a non-limiting example, the upsampling and/or downsampling may include bilinearly upsampling and/or downsampling one or more confidence scores.

At 1012, the process 1000 may include combining confidence scores (e.g., by sum, weighted sum, etc.). For example, the first confidence score may be combined with the upsampled or downsampled second confidence score. In some implementations, the combination of confidence scores may be renormalized as renormalized confidence scores.

If it is determined (at 1008) that the confidence scores are at a same scale, then the process 1000 may proceed to combining the confidence scores, at 1012. In some implementations, the combination of confidence scores may be renormalized as renormalized confidence scores.

At 1014, the process 1000 may include determining a classification probability distribution for the set of LIDAR points. For example, the classification distribution may be determined based at least in part on a combination of the confidence scores. Such determination may be corresponded to any other system or subsystem of the vehicle for planning (e.g., a planner, such as the planning component 1124 described herein with reference to FIG. 11).

In some implementations, a pixel classification probability distribution may be determined based on an interpolation (e.g., a linear, bilinear, bicubic, nearest-neighbor, area, and/or Lanczos, etc., interpolation) of the renormalized confidence scores, and the classification probability distribution for the set of LIDAR points may be determined based at least in part on the pixel classification probability distribution. In some examples, the renormalized confidence scores may be quantized, and determining the pixel classification probability distribution may include unquantizing the quantized confidence scores before performing the requested interpolation.

FIG. 11 is a block diagram of an example system 1100 for implementing the techniques described herein. In some embodiments, the system 1100 may include one or multiple features, components, and/or functionality of embodiments described herein with reference to FIGS. 1-10.

In some embodiments, the system 1100 may include a vehicle 1102 (e.g., the vehicle 102 described herein with reference to FIG. 1). The vehicle 1102 may include a vehicle computing device 1104, one or more sensor system 1106, one or more emitters 1108, one or more communication connections 1110, at least one direct connection 1112, and one or more drive modules 1114.

The vehicle computing device 1104 can include one or more processors 1116 and memory 1118 communicatively coupled with the one or more processors 1116. In the illustrated example, the vehicle 1102 is an autonomous vehicle; however, the vehicle 1102 could be any other type of vehicle, or any other system having at least an image capture device (e.g., a camera enabled smartphone). In the illustrated example, the memory 1118 of the vehicle computing device 1104 stores a localization component 1120, a perception component 1122 (which may include the semantic segmentation component 136), a planning component 1124, one or more system controllers 1126, and the LIDAR filter component 138. Though depicted in FIG. 11 as residing in the memory 1118 for illustrative purposes, it is contemplated that the localization component 1120, the perception component 1122, the semantic segmentation component 136, the planning component 1124, the one or more system controllers 1126, and the LIDAR filter component 138 can additionally, or alternatively, be accessible to the vehicle 1102 (e.g., stored on, or otherwise accessible by, memory remote from the vehicle 1102). In some instances, the vehicle computing device(s) 1104 can correspond to the vehicle computing system 134 of FIG. 1.

In at least one example, the localization component 1120 can include functionality to receive data from the sensor system(s) 1106 to determine a position and/or orientation of the vehicle 1102 (e.g., one or more of an x-, y-, z-position, roll, pitch, or yaw). For example, the localization component 1120 can include and/or request/receive a map of an environment and can continuously determine a location and/or orientation of the autonomous vehicle within the map. In some instances, the localization component 1120 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 1120 can provide data to various components of the vehicle 1102 to determine an initial position of an autonomous vehicle for generating a trajectory and/or for determining to retrieve map data including an occlusion grid from memory, as discussed herein.

In some instances, the perception component 1122 can include functionality to perform object detection, segmentation (e.g., semantic segmentation via functionality provided by the semantic segmentation component 136), and/or classification. In some examples, the perception component 1122 can provide processed sensor data that indicates a presence of an entity that is proximate to the vehicle 1102 and/or a classification of the entity as an entity type (e.g., car, pedestrian, cyclist, animal, building, tree, road surface, curb, sidewalk, unknown, etc.). In additional and/or alternative examples, the perception component 1122 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In some instances, the perception component 1122 can operate in conjunction with the semantic segmentation component 136 to segment image data, as discussed herein.

In general, the planning component 1124 can determine a path for the vehicle 1102 to follow to traverse through an environment. For example, the planning component 1124 can determine various routes and trajectories and various levels of detail. For example, the planning component 1124 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 1124 can generate an instruction for guiding the autonomous vehicle along at least a portion of the route from the first location to the second location. In at least one example, the planning component 1124 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 1102 to navigate.

In some examples, the planning component 1124 can use temporal logic, such as linear temporal logic and/or signal temporal logic, to evaluate one or more trajectories of the vehicle 1102. Details of utilizing temporal logic in the planning component 1124 are discussed in U.S. application Ser. No. 15/632,147, which is herein incorporated by reference, in its entirety.

In at least one example, the vehicle computing device 1104 can include one or more system controllers 1126, which can be configured to control steering, propulsion, braking, safety, emitters, communication, and other systems of the vehicle 1102. These system controller(s) 1126 can communicate with and/or control corresponding systems of the drive module(s) 1114 and/or other components of the vehicle 1102.

The memory 1118 can further include one or more maps (not shown) that can be used by the vehicle 1102 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps can include at least one map (e.g., images and/or a mesh). In some examples, the vehicle 1102 can be controlled based at least in part on the maps. That is, the maps can be used in connection with the localization component 1120, the perception component 1122, and/or the planning component 1124 to determine a location of the vehicle 1102, identify objects in an environment, and/or generate routes and/or trajectories to navigate within an environment.

In some examples, the one or more maps can be stored on a remote computing device(s) (such as the computing device(s) 1140) accessible via network(s) 1142. In some examples, multiple maps can be stored based on, for example, a characteristic (e.g., type of entity, time of day, day of week, season of the year, etc.). Storing multiple maps can have similar memory requirements, but increase the speed at which data in a map can be accessed.

The semantic segmentation component 136 can include functionality to receive image data and to segment the image data to identity various objects and/or regions represented in the image data. For example, the segmentation component 136 can include one or more machine learning algorithms trained to identify and segment image data into semantic categories, including but not limited to, a driveable surface, free space (e.g., driveable surfaces) and/or non-free space, a vehicle, a pedestrian, a building, vegetation, and the like. In some instances, the semantic segmentation component 136 can operate in conjunction with the perception component 1122 to perform semantic segmentation on image data and/or on LIDAR data, for example. In some instances, aspects of some or all of the components discussed herein can include any models, algorithms, and/or machine learning algorithms. For example, in some instances, the components in the memory 1118 (and the memory 1146, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 1106 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 1106 can include multiple instances of each of these or other types of sensors. For instance, the LIDAR sensors can include individual LIDAR sensors located at the corners, front, back, sides, and/or top of the vehicle 1102. As another example, the camera sensors can include multiple cameras disposed at various locations about the exterior and/or interior of the vehicle 1102. The sensor system(s) 1106 can provide input to the vehicle computing device 1104. Additionally or alternatively, the sensor system(s) 1106 can send sensor data, via the one or more networks 1146, to the one or more computing device(s) at a particular frequency, after a lapse of a predetermined period of time, in near real-time, etc. In some instances, the sensor system(s) 1106 can correspond to the sensor(s) 128 of FIG. 1.

The vehicle 1102 can also include one or more emitters 1108 for emitting light and/or sound, as described above. The emitters 1108 in this example include interior audio and visual emitters to communicate with passengers of the vehicle 1102. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 1108 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 1102 can also include one or more communication connection(s) 1110 that enable communication between the vehicle 1102 and one or more other local or remote computing device(s). For instance, the communication connection(s) 1110 can facilitate communication with other local computing device(s) on the vehicle 1102 and/or the drive module(s) 1114. Also, the communication connection(s) 1110 can allow the vehicle to communicate with other nearby computing device(s) (e.g., other nearby vehicles, traffic signals, etc.). The communications connection(s) 1110 also enable the vehicle 1102 to communicate with a remote teleoperations computing device or other remote services.

The communications connection(s) 1110 can include physical and/or logical interfaces for connecting the vehicle computing device 1104 to another computing device or a network, such as network(s) 1146. For example, the communications connection(s) 1110 can enable Wi-Fi-based communication such as via frequencies defined by the IEEE 802.11 standards, short range wireless frequencies such as Bluetooth®, cellular communication (e.g., 2G, 4G, 4G, 4G LTE, 5G, etc.) or any suitable wired or wireless communications protocol that enables the respective computing device to interface with the other computing device(s).

In at least one example, the vehicle 1102 can include one or more drive modules 1114. In some examples, the vehicle 1102 can have a single drive module 1114. In at least one example, if the vehicle 1102 has multiple drive modules 1114, individual drive modules 1114 can be positioned on opposite ends of the vehicle 1102 (e.g., the front and the rear, etc.). In at least one example, the drive module(s) 1114 can include one or more sensor systems to detect conditions of the drive module(s) 1114 and/or the surroundings of the vehicle 1102. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 1114. In some cases, the sensor system(s) on the drive module(s) 1114 can overlap or supplement corresponding systems of the vehicle 1102 (e.g., sensor system(s) 1106).

The drive module(s) 1114 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 1114 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 1114. Furthermore, the drive module(s) 1114 also include one or more communication connection(s) that enable communication by the respective drive module with one or more other local or remote computing device(s).

In at least one example, the direct connection 1112 can provide a physical interface to couple the one or more drive module(s) 1114 with the body of the vehicle 1102. For example, the direction connection 1112 can allow the transfer of energy, fluids, air, data, etc. between the drive module(s) 1114 and the vehicle. In some instances, the direct connection 1112 can further releasably secure the drive module(s) 1114 to the body of the vehicle 1102.

In at least one example, the components discussed herein can process sensor data, as described above, and can send their respective outputs, over the one or more network(s) 1142, to one or more computing device(s) 1140. In at least one example, the components discussed herein can send their respective outputs to the one or more computing device(s) 1140 at a particular frequency, after a lapse of a predetermined period of time, in near real-time, etc.

In some examples, the vehicle 1102 can send sensor data to one or more computing device(s) 1140 via the network(s) 1142. In some examples, the vehicle 1102 can send raw sensor data to the computing device(s) 1140. In other examples, the vehicle 1102 can send processed sensor data and/or representations of sensor data to the computing device(s) 1140. In some examples, the vehicle 1102 can send sensor data to the computing device(s) 1140 at a particular frequency, after a lapse of a predetermined period of time, in near real-time, etc. In some cases, the vehicle 1102 can send sensor data (raw or processed) to the computing device(s) 1140 as one or more log files.

The computing device(s) 1140 can include processor(s) 1144 and a memory 1146 storing a maps(s) component 1148, the semantic segmentation component 136, and/or the LIDAR filter component 138.

The processor(s) 1116 of the vehicle 1102 and the processor(s) 1144 of the computing device(s) 1140 can be any suitable processor capable of executing instructions to process data and perform operations as described herein. By way of example and not limitation, the processor(s) 1116 and 1144 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 1118 and 1146 are examples of non-transitory computer-readable media. The memory 1118 and 1146 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 11 is illustrated as a distributed system, in alternative examples, components of the vehicle 1102 can be associated with the computing device(s) 1140 and/or components of the computing device(s) 1140 can be associated with the vehicle 1102. That is, the vehicle 1102 can perform one or more of the functions associated with the computing device(s) 1140, and vice versa. Further, aspects of the semantic segmentation component 136 and/or the LIDAR filter component 138 can be performed on any of the devices discussed herein.

FIGS. 3 and 7-10 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A. An autonomous vehicle comprising: one or more processors; and one or more non-transitory computer-readable media storing instructions executable by the one or more processors, wherein the instructions, when executed, cause the one or more processors to perform operations comprising: receiving, from a LIDAR device on the autonomous vehicle, LIDAR data associated with an environment proximate the autonomous vehicle, the LIDAR data comprising a set of LIDAR points; receiving, from a camera on the autonomous vehicle, image data associated with an image of a portion of the environment; projecting, as a LIDAR projection onto the image, a voxel associated with a point of the set of LIDAR points; determining, based at least in part on a label associated with the image, a classification for a pixel associated with the voxel; and determining, based at least in part on the classification, that the set of LIDAR points represents a navigable space for the autonomous vehicle.

B. The autonomous vehicle as paragraph A recites, wherein the instructions further cause the one or more processors to perform operations comprising: projecting, as additional LIDAR projections onto the image, additional voxels associated with the set of LIDAR points; determining additional classifications for pixels; aggregating scores associated with the classification and additional classifications to produce an aggregation of scores; and determining, based at least in part on the aggregation of scores, a classification for the set of LIDAR points.

C. The autonomous vehicle as paragraph B recites, wherein the determining that the set of LIDAR points represents a navigable space for the autonomous vehicle further comprises: determining, based at least in part on the classification for the set of LIDAR points, to assign the set of LIDAR points to a class associated with a navigable space.

D. The autonomous vehicle as any one of paragraphs A-C recites, wherein the instructions further cause the one or more processors to perform operations comprising: determining that one or more safety conditions are satisfied; discarding, from data used to plan at least one of a trajectory or a route of the autonomous vehicle, LIDAR data associated with the set of LIDAR points, wherein the discarding is based at least in part on the determining that the set of LIDAR points represents a navigable space for the autonomous vehicle; and controlling, based at least in part on the data used to plan the at least one of the trajectory or the route of the autonomous vehicle, movement of the autonomous vehicle.

E. The autonomous vehicle as any one of paragraphs A-D recites, wherein the determining the classification for the pixel associated with the voxel comprises: determining, based at least in part on a semantic segmentation of the image, a classification probability distribution for the pixel associated with the voxel.

F. A computer-implemented method comprising: receiving first data from a first sensor, the first data associated with a set of points of a three-dimensional (3D) point cloud of an environment; receiving second data from a second sensor, the second data associated with an image associated with the portion of the environment; associating a portion of the set of points with a portion of the second data; determining a classification associated with the portion of the set of points; and determining, based at least in part on the classification, that the portion of the set of points represents a navigable space for a vehicle.

G. The computer-implemented method as paragraph F recites, wherein the determining the classification associated with the portion of the set of points comprises: projecting, onto the image, data associated with the portion of the set of points; and determining, based at least in part on a label associated with the image, the classification associated with the portion of the set of points.

H. The computer-implemented method as either paragraph F or G recites, wherein the determining the classification associated with the portion of the set of points comprises: determining, based at least in part on a semantic segmentation of the image, a classification probability distribution associated with the portion of the set of points.

I. The computer-implemented method as either paragraph G or H recites, further comprising: projecting, onto the image, additional data associated with the portion of the set of points; determining additional classifications for the portion of the set of points; and aggregating scores associated with the classification and the additional classifications; wherein the determining that the portion of the set of points represents a navigable space for the vehicle is based at least in part on the aggregating.

J. The computer-implemented method as any one of paragraphs F-I recites, wherein: the vehicle comprises an autonomous vehicle; and the computer-implemented method further comprises: assigning the set of points to a class of object associated with a navigable space; and discarding, from data used to plan at least one of a trajectory or a route of the autonomous vehicle, at least a portion of the first data associated with the set of points, wherein the discarding is based at least in part on the determining that the portion of the set of points represents a navigable space for the vehicle.

K. The computer-implemented method as paragraph J recites, further comprising: controlling, based at least in part on the data used to plan the at least one of the trajectory or the route of the autonomous vehicle, movement of the autonomous vehicle.

L. The computer-implemented method as either paragraph J or K recites, further comprising: determining that one or more safety conditions are satisfied; wherein the discarding the at least a portion of the first data associated with the set of points is further based at least in part on the determining that the one or more safety conditions are satisfied.

M. The computer-implemented method as paragraph L recites, wherein the one or more safety conditions comprise at least one of: a first condition that a distance, between the set of points and the vehicle, satisfies a threshold distance; a second condition that a speed of the vehicle satisfies a threshold speed; a third condition that an amount of the set of points that projects onto the image satisfies a threshold amount; or a fourth condition that a confidence level associated with the set of points belonging to a class associated with a navigable surface satisfies a threshold confidence level.

N. The computer-implemented method as any one of paragraphs F-M recites, wherein: the set of points is a first set of points; and the computer-implemented method further comprises: receiving third data associated with a second set of points; determining that the second set of points represents an obstacle to the vehicle; and controlling, based at least in part on the third data, movement of the vehicle.

O. The computer-implemented method as any one of paragraphs F-N recites, wherein: the first data is associated with a first time stamp; the second data is associated with a second time stamp; the computer-implemented method further comprises: determining that an amount of time, between the first time stamp and the second time stamp, satisfies a threshold amount of time; and the determining the classification associated with the portion of the set of points is based at least in part on the determining that the amount of time satisfies the threshold amount of time.

P. The computer-implemented method as any one of paragraphs F-O recites, further comprising: inputting, into a machine learning algorithm, the first data associated with the set of points; receiving, as output from the machine learning algorithm, a first score associated with a first probability that the set of points belongs to a first class of object; determining, based at least in part on a semantic segmentation of the image, a second score associated with a second probability that the set of points belongs to a second class of object that is different from the first class of object; determining that a difference between the first score and the second score satisfies a threshold difference; and assigning, based at least in part on the determining that the difference between the first score and the second score satisfies the threshold difference, the set of points to the second class of object.

Q. One or more non-transitory computer-readable media storing instructions executable by one or more processors, wherein the instructions, when executed, cause the one or more processors to perform operations comprising: obtaining point cloud data comprising a set of points associated with measurements of an environment, the environment associated with a vehicle; obtaining image data associated with an image comprising at least a portion of the environment associated with the set of points; associating a portion of the set of points with a portion of the image data; determining a classification associated with the portion of the set of points; and determining, based at least in part on the classification, that the portion of the set of points represents a navigable space for the vehicle.

R. The one or more non-transitory computer-readable media as paragraph Q recites, wherein the determining the classification associated with the portion of the set of points comprises: projecting, onto the image, data associated with the portion of the set of points; and determining, based at least in part on a semantic segmentation of the image, a classification probability distribution associated with the portion of the set of points.

S. The one or more non-transitory computer-readable media as either paragraph Q or R recites, wherein the instructions further cause the one or more processors to perform operations comprising: discarding, from data used to plan at least one of a trajectory or a route of the vehicle, at least a portion of the point cloud data associated with the set of points, wherein the discarding is based at least in part on the determining that the portion of the set of points represents a navigable space for the vehicle; and controlling, based at least in part on the data used to plan the at least one of the trajectory or the route of the vehicle, movement of the vehicle.

T. The one or more non-transitory computer-readable media as paragraph S recites, wherein the instructions further cause the one or more processors to perform operations comprising: determining that one or more safety conditions are satisfied; wherein the discarding the at least a portion of the point cloud data associated with the set of points is further based at least in part on the determining that the one or more safety conditions are satisfied.

U. An autonomous vehicle comprising: one or more processors; and one or more non-transitory computer-readable media storing instructions executable by the one or more processors, wherein the instructions, when executed, cause the one or more processors to perform operations comprising: receiving LIDAR data associated with a set of LIDAR points; receiving image data associated with an image of a portion of an environment associated with the set of LIDAR points; performing semantic segmentation on the image at multiple scales to determine pixel classifications for pixels of the image, the pixel classifications comprising: a first confidence score associated with a first scale; and a second confidence score associated with a second scale different than the first scale; upsampling or downsampling the second confidence score to the first scale to generate an upsampled or downsampled second confidence score that is at the same scale as the first confidence score; combining confidence scores including the first confidence score and the upsampled or downsampled second confidence score; and determining, based at least in part on a combination of the confidence scores, a classification for the set of LIDAR points.

V. The autonomous vehicle as paragraph U recites, wherein the instructions further cause the one or more processors to perform operations comprising: projecting, onto the image, data associated with the set of LIDAR points to identify projected pixel coordinates of the image; and querying pixel classifications for the projected pixel coordinates; wherein the determining the classification for the set of LIDAR points is based at least in part on the pixel classifications for the projected pixel coordinates.

W. The autonomous vehicle as paragraph V recites, wherein the querying pixel classification probability distributions for the projected pixel coordinates comprises: performing, based at least in part on the projected pixel coordinates, a bilinear interpolation or a bicubic interpolation of information associated with the semantic segmentation.

X. The autonomous vehicle as any one of paragraphs U-W recites, wherein the performing the semantic segmentation comprises: inputting, into a convolutional neural network, the image at the multiple scales; and receiving, as output from the convolutional neural network, pixel classifications for pixels of the image.

Y. A system comprising: one or more processors; and one or more non-transitory computer-readable media storing instructions executable by the one or more processors, wherein the instructions, when executed, cause the system to perform operations comprising: receiving first data from a first sensor, the first data associated with an image of a portion of an environment proximate the system; determining first confidence scores for pixels in the image associated with one or more classifications; scaling the image to form a scaled image; determining second confidence scores for pixels in the scaled image associated with the one or more classifications; upsampling or downsampling at least one of the first confidence scores or the second confidence scores to generate scaled confidence scores; combining the first or second confidence scores and the scaled confidence scores as a confidence combination; performing, based at least in part on a set of query pixel coordinates, an interpolation of the confidence combination; and determining a pixel classification.

Z. The system as paragraph Y recites, wherein the instructions further cause the system to perform operations comprising: receiving, as a three-dimensional (3D) point cloud, second data from a second sensor, the 3D point cloud representing at least a portion of the environment associated with the image; determining, as a set of points of the 3D point cloud, a portion of the second data; and projecting, onto the image, data associated with a portion of the set of points to identify projected pixels, wherein the set of query pixel coordinates comprises the projected pixels; and determining, based at least in part on the pixel classification, a classification for the set of points.

AA. The system as either paragraph Y or Z recites, wherein the instructions further cause the system to perform operations comprising: determining, based at least in part on the classification for the set of points, that the set of points represents a navigable space for a vehicle in the environment; and discarding, from data used to plan at least one of a trajectory or a route of the vehicle, at least a portion of the second data associated with the set of points.

BB. The system as paragraph AA recites, wherein the instructions further cause the system to perform operations comprising: controlling, based at least in part on the data used to plan the at least one of the trajectory or the route of the vehicle, movement of the vehicle.

CC. The system as either paragraph AA or BB recites, wherein the vehicle comprises an autonomous vehicle.

DD. The system as any one of paragraphs Y-CC recites, wherein: the first sensor comprises an image sensor; the first data comprises image data; the second sensor comprises a LIDAR sensor; the second data comprises LIDAR data; and the set of points comprises a set of LIDAR points.

EE. The system as any one of paragraphs Y-DD recites, wherein the upsampling or downsampling the at least one of the first confidence scores or the second confidence scores comprises: performing bilinear upsampling or bilinear downsampling.

FF. The system as any one of paragraphs Y-EE recites, wherein the interpolation of the confidence combination comprises at least one of: a linear interpolation; a bilinear interpolation; a bicubic interpolation; a nearest-neighbor interpolation; an area interpolation; or a Lanczos interpolation.

GG. The system as any one of paragraphs Y-FF recites, wherein the instructions further cause the system to perform operations comprising: determining a pixel classification probability distribution; wherein: the pixel classification probability distribution comprises: the first confidence scores associated with the first scale; and the second confidence scores associated with the second scale; and the determining the pixel classification is based at least in part on the pixel classification probability distribution.

HH. The system as any one of paragraphs Y-GG recites, wherein: the determining the first confidence scores comprises: inputting the image into a first machine learned algorithm, the first machine learned algorithm trained to output confidence scores for pixels in the image associated with the one or more classifications; and receiving, as output from the first machine learned algorithm, the first confidence scores; and the determining the second confidence scores comprises: inputting the scaled image into a second machine learned algorithm, the second machine learned algorithm trained to output confidence scores for pixels in the scaled image associated with the one or more classifications; and receiving, as output from the second machine learned algorithm, the second confidence scores.

II. The system as any one of paragraphs Y-HH recites, wherein the instructions further cause the system to perform operations comprising: renormalizing the confidence combination as renormalized confidence scores; and quantizing the renormalized confidence scores as quantized confidence scores, wherein the determining the pixel classification comprises unquantizing the quantized confidence scores.

JJ. A computer-implemented method comprising: obtaining an image from a camera, the image associated with a portion of an environment; determining a first confidence output and a second confidence output, wherein the first confidence output is associated with a first scale and the second confidence output is associated with a second scale different than the first scale, the first confidence output comprising a set of confidences that pixels of the image are associated with one or more classifications and the second confidence output comprising a set of confidences that pixels of the image are associated with the one or more classifications; upsampling or downsampling, based at least in part on an interpolation, at least one of the first confidence output or the second confidence output to generate a scaled confidence output; combining the scaled confidence output and the first or second confidence output as a confidence combination; and determining, based at least in part on a pixel coordinate and the confidence combination, a classification associated with the pixel coordinate.

KK. The method as paragraph JJ recites, further comprising: receiving LIDAR data from a LIDAR device, the LIDAR data associated with at least a portion of the environment associated with the image data; determining a portion of the LIDAR data which comprise a LIDAR blob, the LIDAR blob indicative of an object in the environment; projecting, onto the image as projected pixels, data associated with points of the LIDAR blob; and determining, based at least in part on classifications associated with the projected pixels, a classification for the LIDAR blob; wherein: the pixel coordinate comprises the projected pixels; and the determining the classification associated with the pixel coordinate comprises: performing, based at least in part on the pixel coordinate, a bilinear interpolation of the confidence combination.

LL. The method as paragraph KK recites, further comprising: determining, based at least in part on the classification for the LIDAR blob, that the LIDAR blob represents a navigable space for a robot in the environment; discarding, from data used to plan at least one of a trajectory or a route of the robot, a portion of the first data associated with the points of the LIDAR blob; and controlling, based at least in part on the data used to plan the at least one of the trajectory or the route of the robot, movement of the robot.

MM. The method as any one of JJ-LL recites, wherein the upsampling or downsampling comprises: bilinearly upsampling at least one of the first confidence output or the second confidence output.

NN. The method as any one of JJ-MM recites, wherein: the determining the first confidence output and the second confidence output comprises performing semantic segmentation at a first scale and a second scale; and the performing the semantic segmentation comprises: inputting, into a machine learning algorithm, the image at the first scale and the second scale; and receiving, as output from the machine learning algorithm, the first confidence output and the second confidence output.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:
1. An autonomous vehicle comprising:
one or more processors; and
one or more non-transitory computer-readable media storing instructions executable by the one or more proces- sors, wherein the instructions, when executed, cause the one or more processors to perform operations comprising:
   receiving LIDAR data associated with a set of LIDAR points;
   receiving image data associated with an image of a portion of an environment associated with the set of LIDAR points;
   performing semantic segmentation on the image at multiple scales to determine pixel classifications for pixels of the image, the pixel classifications comprising:
      a first confidence score associated with a first scale; and
      a second confidence score associated with a second scale different than the first scale;
   upsampling or downsampling the second confidence score to the first scale to generate an upsampled or downsampled second confidence score that is combinable at a same scale with the first confidence score;
   combining, as a combined confidence score, the first confidence score and the upsampled or downsampled second confidence score; and
   determining, based at least in part on the combined confidence score, a classification for the set of LIDAR points.

2. The autonomous vehicle of claim 1, wherein the instructions further cause the one or more processors to perform operations comprising:
   projecting, onto the image, data associated with the set of LIDAR points to identify projected pixel coordinates of the image; and
   querying pixel classifications for the projected pixel coordinates;
   wherein the determining the classification for the set of LIDAR points is based at least in part on the pixel classifications for the projected pixel coordinates.

3. The autonomous vehicle of claim 2, wherein querying the pixel classification probability distributions for the projected pixel coordinates comprises:
   performing, based at least in part on the projected pixel coordinates, a bilinear interpolation or a bicubic interpolation of information associated with the semantic segmentation.

4. The autonomous vehicle of claim 1, wherein performing the semantic segmentation comprises:
   inputting, into a convolutional neural network, the image at the multiple scales; and
   receiving, as output from the convolutional neural network, pixel classifications for pixels of the image.

5. A system comprising:
   one or more processors; and
   one or more non-transitory computer-readable media storing instructions executable by the one or more processors, wherein the instructions, when executed, cause the system to perform operations comprising:
      receiving first data from a first sensor, the first data associated with an image of a portion of an environment proximate the system;
      determining first confidence scores for pixels in the image associated with one or more classifications;
      scaling the image to form a scaled image;
      determining second confidence scores for pixels in the scaled image associated with the one or more classifications;
      upsampling or downsampling the second confidence scores to generate an upsampled or downsampled second confidence score that is combinable at a same scale with the first confidence scores;
      combining the first confidence scores and the upsampled or downsampled second confidence scores to generate a confidence combination;
      performing, based at least in part on a set of query pixel coordinates, an interpolation of the confidence combination; and
      determining a pixel classification.

6. The system of claim 5, wherein the instructions further cause the system to perform operations comprising:
   receiving, as a three-dimensional (3D) point cloud, second data from a second sensor, the 3D point cloud representing at least a portion of the environment associated with the image;
   determining, as a set of points of the 3D point cloud, a portion of the second data; and
   projecting, onto the image, data associated with a portion of the set of points to identify projected pixels, wherein the set of query pixel coordinates comprises the projected pixels; and
   determining, based at least in part on the pixel classification, a classification for the set of points.

7. The system of claim 6, wherein the instructions further cause the system to perform operations comprising:
   determining, based at least in part on the classification for the set of points, that the set of points represents a navigable space for a vehicle in the environment; and
   discarding, from data used to plan at least one of a trajectory or a route of the vehicle, at least a portion of the second data associated with the set of points.

8. The system of claim 7, wherein the instructions further cause the system to perform operations comprising:
   controlling, based at least in part on the data used to plan the at least one of the trajectory or the route of the vehicle, movement of the vehicle.

9. The system of claim 8, wherein the vehicle comprises an autonomous vehicle.

10. The system of claim 6, wherein:
   the first sensor comprises an image sensor;
   the first data comprises image data;
   the second sensor comprises a LIDAR sensor;
   the second data comprises LIDAR data; and
   the set of points comprises a set of LIDAR points.

11. The system of claim 5, wherein the upsampling or downsampling the at least one of the first confidence scores or the second confidence scores comprises:
   performing bilinear upsampling or bilinear downsampling.

12. The system of claim 5, wherein the interpolation of the confidence combination comprises at least one of:
   a linear interpolation;
   a bilinear interpolation;
   a bicubic interpolation;
   a nearest-neighbor interpolation;
   an area interpolation; or
   a Lanczos interpolation.

13. The system of claim 5, wherein the instructions further cause the system to perform operations comprising:
   determining a pixel classification probability distribution;
   wherein:
      the pixel classification probability distribution comprises:
         the first confidence scores associated with a first scale; and the second confidence scores associated with a second scale; and
the determining the pixel classification is based at least in part on the pixel classification probability distribution.

14. The system of claim 5, wherein:
the determining the first confidence scores comprises:
inputting the image into a first machine learned algorithm, the first machine learned algorithm trained to output confidence scores for pixels in the image associated with the one or more classifications; and
receiving, as output from the first machine learned algorithm, the first confidence scores; and
the determining the second confidence scores comprises:
inputting the scaled image into a second machine learned algorithm, the second machine learned algorithm trained to output confidence scores for pixels in the scaled image associated with the one or more classifications; and
receiving, as output from the second machine learned algorithm, the second confidence scores.

15. The system of claim 5, wherein the instructions further cause the system to perform operations comprising:
renormalizing the confidence combination as renormalized confidence scores; and
quantizing the renormalized confidence scores as quantized confidence scores, wherein the determining the pixel classification comprises unquantizing the quantized confidence scores.

16. A computer-implemented method comprising:
obtaining an image from a camera, the image associated with a portion of an environment;
determining a first confidence output and a second confidence output, wherein the first confidence output is associated with a first scale and the second confidence output is associated with a second scale different than the first scale, the first confidence output comprising a set of confidences that pixels of the image are associated with one or more classifications and the second confidence output comprising a set of confidences that pixels of the image are associated with the one or more classifications;
upsampling or downsampling, based at least in part on an interpolation, the second confidence output to generate an upsampled or downsampled second confidence output that is combinable at a same scale with the first confidence output;
combining the first confidence output and the upsampled or downsampled second confidence output as a confidence combination; and
determining, based at least in part on a pixel coordinate and the confidence combination, a classification associated with the pixel coordinate.

17. The method of claim 16, further comprising:
receiving LIDAR data from a LIDAR device, the LIDAR data associated with at least a portion of the environment associated with the image;
determining a portion of the LIDAR data which comprise a LIDAR blob, the LIDAR blob indicative of an object in the environment;
projecting, onto the image as projected pixels, data associated with points of the LIDAR blob; and
determining, based at least in part on classifications associated with the projected pixels, a classification for the LIDAR blob;
wherein:
the pixel coordinate comprises the projected pixels; and
the determining the classification associated with the pixel coordinate comprises:
performing, based at least in part on the pixel coordinate, a bilinear interpolation of the confidence combination.

18. The method of claim 17, further comprising:
determining, based at least in part on the classification for the LIDAR blob, that the LIDAR blob represents a navigable space for a robot in the environment;
discarding, from data used to plan at least one of a trajectory or a route of the robot, a portion of the LIDAR data associated with the points of the LIDAR blob; and
controlling, based at least in part on the data used to plan the at least one of the trajectory or the route of the robot, movement of the robot.

19. The method of claim 16, wherein the upsampling or downsampling comprises:
bilinearly upsampling at least one of the first confidence output or the second confidence output.

20. The method of claim 16, wherein:
the determining the first confidence output and the second confidence output comprises performing semantic segmentation at a first scale and a second scale; and
the performing the semantic segmentation comprises:
inputting, into a machine learning algorithm, the image at the first scale and the second scale; and
receiving, as output from the machine learning algorithm, the first confidence output and the second confidence output.

* * * * *